(12) United States Patent
Molinelli

(10) Patent No.: US 10,438,392 B2
(45) Date of Patent: Oct. 8, 2019

(54) TECHNIQUES FOR ONTOLOGY DRIVEN ANIMATION

(71) Applicant: Evan John Molinelli, Brooklyn, NY (US)

(72) Inventor: Evan John Molinelli, Brooklyn, NY (US)

( * ) Notice: Subject to any disclaimer, the term of this patent is extended or adjusted under 35 U.S.C. 154(b) by 0 days.

(21) Appl. No.: 15/840,450

(22) Filed: Dec. 13, 2017

(65) Prior Publication Data

US 2018/0165861 A1    Jun. 14, 2018

Related U.S. Application Data

(60) Provisional application No. 62/433,515, filed on Dec. 13, 2016.

(51) Int. Cl.
*G06T 13/20*    (2011.01)
*G06F 16/36*    (2019.01)

(52) U.S. Cl.
CPC ............ *G06T 13/20* (2013.01); *G06F 16/367* (2019.01)

(58) Field of Classification Search
None
See application file for complete search history.

(56) References Cited

U.S. PATENT DOCUMENTS

| | | | | |
|---|---|---|---|---|
| 6,714,201 B1 * | 3/2004 | Grinstein | ................ | G06T 13/20 345/474 |
| 8,269,777 B2 * | 9/2012 | Warner | ................... | G06T 19/00 345/419 |
| 2012/0256928 A1 * | 10/2012 | Chiculita | ................ | G06T 13/20 345/473 |
| 2013/0286025 A1 * | 10/2013 | Spells, III | ............... | G06T 13/20 345/473 |
| 2014/0049547 A1 * | 2/2014 | Cabanier | ................. | G06T 13/00 345/473 |
| 2014/0267308 A1 * | 9/2014 | McNerney | .............. | G06T 13/20 345/473 |

OTHER PUBLICATIONS

Van Der Spoel, David, et al. "GROMACS: fast, flexible, and free." Journal of computational chemistry 26.16 (2005): 1701-1718.*

(Continued)

*Primary Examiner* — Ryan M Gray
(74) *Attorney, Agent, or Firm* — Beusse Wolter Sanks & Maire; Eugene J. Molinelli

(57) ABSTRACT

A stylesheet data structure includes a plurality of stylesheet records, each comprising an ontology concept field, a presentation instruction field, and a presentation identifier field. Techniques for ontology driven animation includes receiving a request to render an instance of a first concept in an annotation with an associated ontology. It is determined whether a stylesheet file includes a first stylesheet record that indicates the first concept, wherein the first stylesheet record also indicates a first presentation identifier. If so, then an instance of a first component of the first concept is rendered according to a presentation instruction indicated in a second stylesheet record that also indicates the first presentation identifier. In some embodiments, the instance of the first component of the first concept is an instance of the first concept and the second stylesheet record is the first stylesheet record.

15 Claims, 18 Drawing Sheets

(56) References Cited

OTHER PUBLICATIONS

Polys, Nicholas F. "Stylesheet transformations for interactive visualization: towards a Web3D chemistry curricula." Proceedings of the eighth international conference on 3D Web technology. ACM, 2003.*

Park, Minho, and Paul A. Fishwick. "Integrating dynamic and geometry model components through ontology-based inference." Simulation 81.12 (2005): 795-813.*

Shirota, Yukari. "A metadata framework for generating web-based learning materials." 2004 International Symposium on Applications and the Internet Workshops. 2004 Workshops . . . IEEE, 2004.*

* cited by examiner

FIG. 1
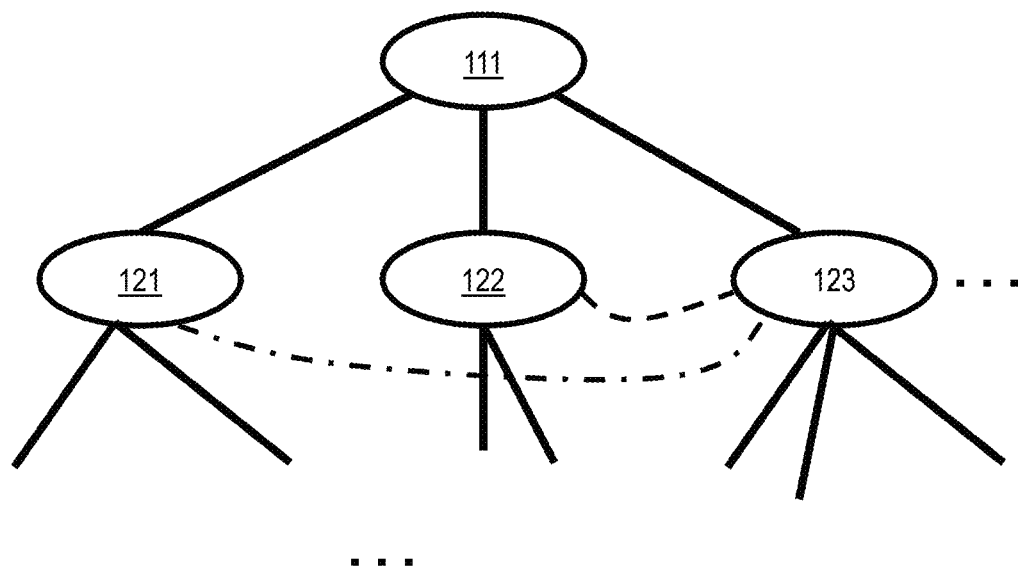
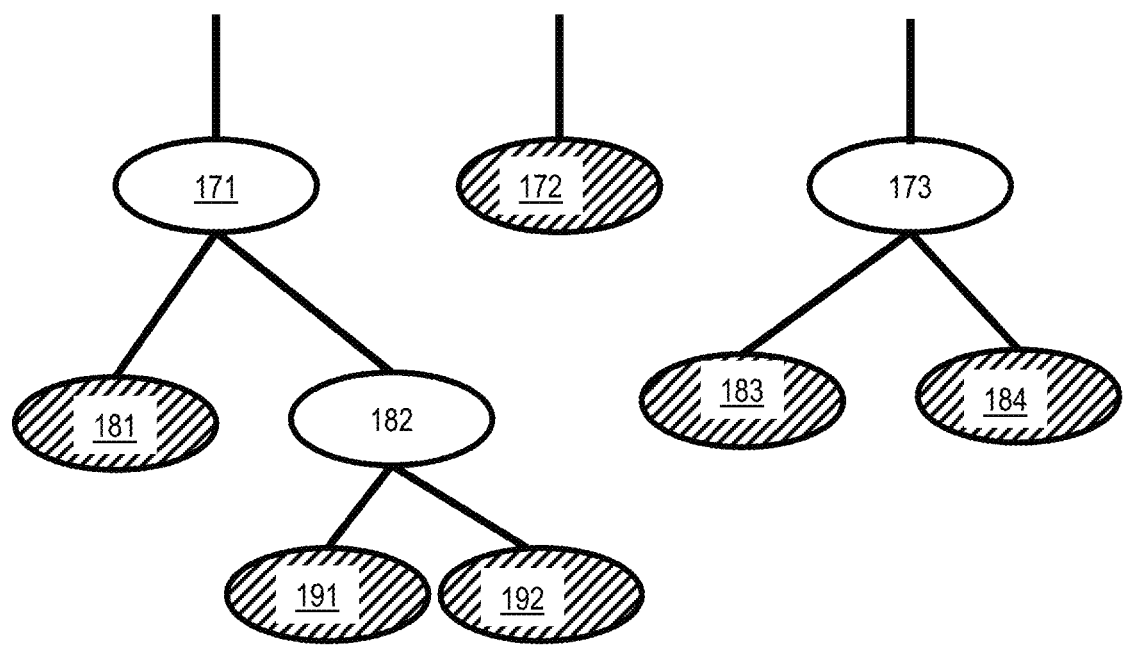

FIG. 3A

3D GRAPHICS ENGINE API 300

GRAPHICS ENGINE, OUTPUT SCREEN PROPERTIES, ILLUMINATION POSITIONS, VIEW POSITION, NUMBER OF OBJECTS, FIRST OBJECT MESH, FIRST OBJECT MODEL, FIRST OBJECT SURFACE, FIRST OBJJECT POSITION AND ORIENTATION, PROPERTIES, SECOND OBJECT MESH,...... ., RETURN VARLUES .

— API 301

GRAPHICS ENGINE, CHANGE IN ILLUMINATION , CHANGE IN VIEW , CHANGE IN NUMBER OF OBJECTS, CHANGE IN FIRST OBJECT MESH, CHANGE IN FIRST OBJECT MODEL, CHANGE IN FIRST OBJECT SURFACE PROPERTIES, CHANGE IN FIRST OBJJECT POSITION ORORIENTATION, CHANGE IN SECOND OBJECT MESH ,...... ., RETURN VARLUES

— API 302

FIG. 3B

NON- GRAPHICS ENGINE API 350

PHYSICS ENGINE, FUNCTION(E.G., DETECT COLLISION, AVOID COLLISION, RESOLVE COLLISION),NUMBER OF OBJECTS, FIRST OBJECT MESH, FIRST OBJECT MASS AND VELOCITY AND CHARGE, SECOND OBJECT MESH,......

API 351

CHEMISTRY ENGINE,. FUNCTION (E.G., BIND, RELEASE/ABSORB ENERGY, FORM PRODUCTS AND BYPRODUCTS), NUMBER OF MOLECULES, TYPES OF MOLECULES, POSITION AND ENERGY OF MOLECULES.

API 352

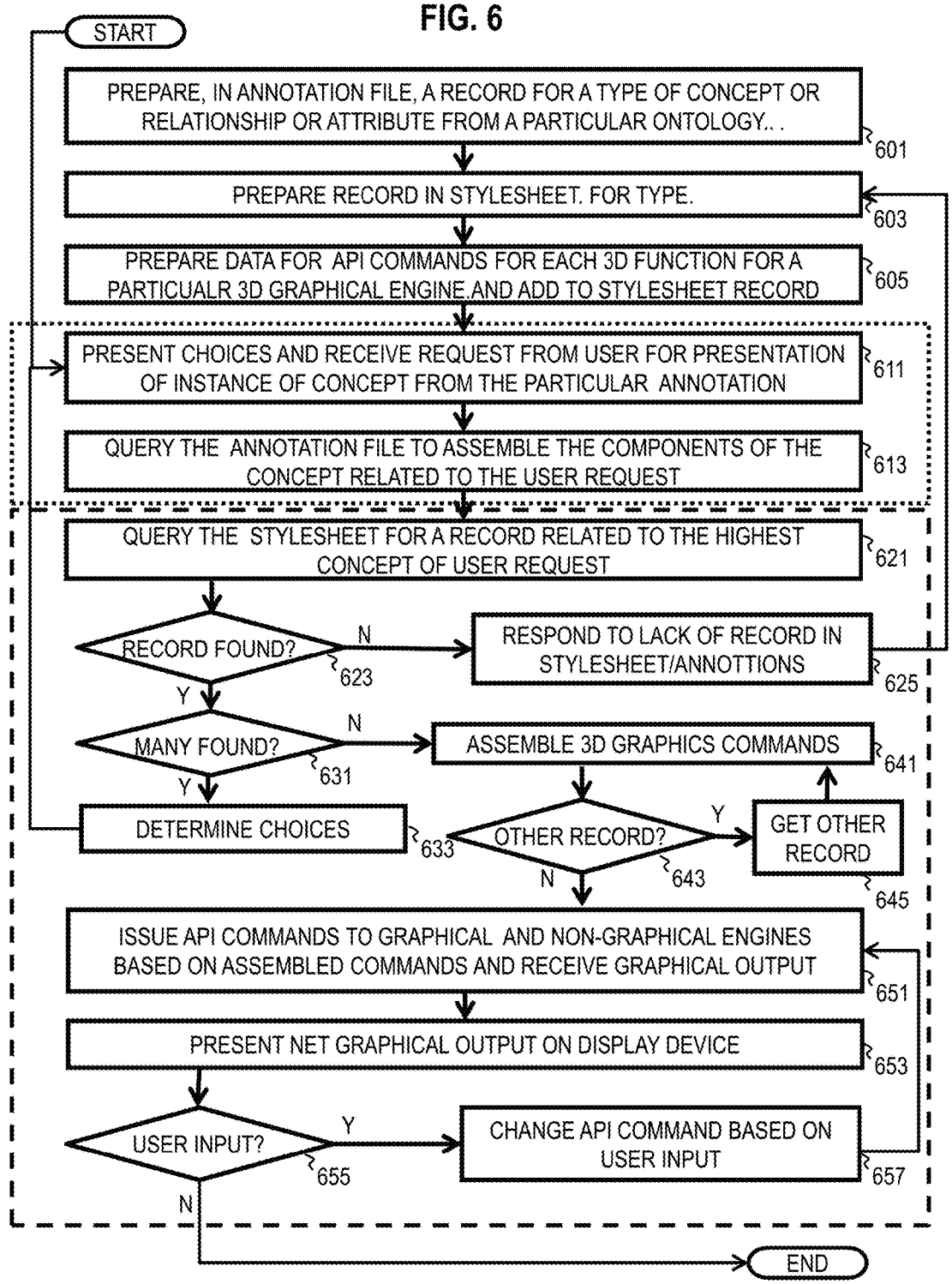

TECHNIQUES FOR ONTOLOGY DRIVEN ANIMATION

BACKGROUND

In computer science and information science, an ontology is a formal naming and definition of the types, properties, and interrelationships of the entities that really or fundamentally exist for a particular domain of discourse. Ontologies are, in brief, controlled vocabularies of a specific knowledge domain such as chemical reactions, gene functions, or animal species. The domains need not be confined to the real world. The ontology consists of concepts arranged in hierarchical classes related by the relationship, such as "has members" and the inverse relationship "is a member of." For example, the concept animal includes subclass concepts such as mammals and reptiles and insects, which themselves can each have further subclass concepts with a leaf concept that has no further member classes. Any concept can be used to describe or generate one or more individuals called instances, such as gene#1 and gene#2. Whereas ontologies define the structure of a domain, ontology annotations are statements made using the terms and relationships defined in the ontology. For example, in addition to the hierarchical classification of domain knowledge, annotations define other relationships among these concepts. For example, an individual or class of insects can have a "symbiotic" relationship with an individual or class or classes of animals. A relationship often is expressed in the form of: a subject concept| a predicate | an object concept, e.g., bacterium A | helps digestion of | organism B. (Note the ontology itself describe the "has members" relationship by the form: class A| has members| class B.) Each concept can have multiple properties, called attributes, such as geographical range, migratory pattern, hibernation, life expectancy for animal species, specified in the annotations. When coupled with descriptive logic rules governing relationships, it is possible to reason about the concepts defined in an ontology.

Common components of ontologies include: Individuals (which are instances or objects—the basic or "ground level" objects); and, Classes (which are sets, collections, concepts, classes in programming, types of objects, or kinds of things). The ontology expresses hierarchical relationships among classes and subclasses to two or more levels. Hereinafter, the term "concepts" is used interchangeably with the term "classes." The ontology may also include, for each concept, zero or more Attributes (which are aspects, properties, features, characteristics, or parameters that individuals and classes can have). Annotations using one or more ontologies can be characterized as additional Attributes; Relationships (which are ways in which classes and individuals can be related to one another); Function terms (which are complex structures formed from certain relations that can be used in place of an individual term in a statement); Restrictions (which are formally stated descriptions of what must be true in order for some assertion to be accepted as input); Rules (which are statements in the form of an if-then or antecedent-consequent sentence that describe the logical inferences that can be drawn from an assertion in a particular form); Axioms (which are assertions, including rules, in a logical form that together comprise the overall theory that the ontology describes in its domain of application, as distinct from an axiom in formal logic); and, Events (which are changes of attributes or relations). The Web Ontology Language (OWL) is a family of knowledge representation languages for authoring ontologies built upon a W3C XML standard for objects called the Resource Description Framework (RDF).

Currently there are many shared or collective knowledge bases that are stored as ontologies, and various tools to maintain and use them. For example BioPax (Biological Pathway Exchange) is a RDF/OWL-based standard language to represent biological pathways at the molecular and cellular level. Its major use is to facilitate the exchange of pathway data. Pathway data captures our understanding of biological processes, but rapid growth due to rapid discovery of new pathways and new pathway details necessitates development of databases and computational tools to aid interpretation. Before BioPax, the fragmentation of pathway information generation across many databases with incompatible formats presented barriers to its effective use. BioPAX solves this problem by making pathway data substantially easier to collect, index, interpret and share. BioPAX can represent metabolic and signaling pathways, molecular and genetic interactions and gene regulation networks. BioPAX was created through a community process. Through BioPAX, millions of interactions organized into thousands of pathways across many organisms, from a growing number of sources, are available. Thus, large amounts of pathway data are available in a computable form to support visualization, analysis and biological discovery.

SUMMARY

It has been determined that it is useful to similarly render in 3D graphical form several instances associated with an ontology automatically by reuse of an initial rendering by storing descriptions of the initial rendering in a stylesheet configured for use with an ontology. Currently such rendering is done on an ad hoc basis manually by an artist using three dimensional (3D) graphical systems. Such systems allow an artist to construct scenes based on placing multiple objects with certain graphical characteristics, such as shape, size, transparency and reflectivity in 3D space. The artist and domain expert must determine the individuals, relationships and attributes from the ontology to be rendered and then decide how to render a scene that depicts the desired components from the ontology. As used herein a component of a concept of an ontology refers to a direct or remote member of the class for the concept or a relationship or any other property expressed in an annotation statement about the ontology.

Here is described a flexible data structure and an infrastructure for joining ontological selections and querying technology to 3D representational creation in accordance with a coherent, stylized story created in collaboration between domain experts, artists and storytellers. A single subject may be told in a variety of ways (perhaps some complex and others simple for different audiences), each encoded in its own stylesheet. An advantage is an ability to reproduce in subsequent presentations, for any story told as annotations in the targeted ontological vocabulary, the artistic and expert decisions first made in a previous telling using the same targeted ontological vocabulary.

In a first set of embodiments, a computer-implemented method receives a request to render an instance of a first concept in an annotation with an associated ontology. It is determined whether a stylesheet file includes a first stylesheet record that indicates the first concept, wherein the first stylesheet record also indicates a first presentation identifier. If so, then an instance of a first component of the first concept is built according to a presentation instruction indicated in another filed of the stylesheet record, which may in turn recursively require selections to one or more other records within the stylesheet, e.g., a second stylesheet record that may also indicate the first presentation identifier.

In some embodiments of the first set, each stylesheet record for a concept includes a presentation sequence field that indicates an animation sequence for the concept. In some of these embodiments, a plurality of components of the first concept is rendered in sequence based on the corresponding plurality of values in the presentation sequence field.

In some embodiments of the first set, the stylesheet file includes multiple stylesheet records that indicate the first concept. The first stylesheet record is selected from the multiple stylesheet records based on: a first context for the first concept indicated in a context field of each stylesheet record, wherein the first context indicates a subset of instances of the first concept based on a first value for a first attribute of a component of the first concept.

In a second set of embodiments, a non-transitory computer-readable medium stores a stylesheet data structure comprising a plurality of stylesheet records, each comprising an ontology concept field, a presentation instruction field, and a presentation identifier field. The ontology concept field holds data that indicates a concept in a particular ontology. The presentation instruction field holds data that indicates instructions for rendering an instance of the concept using a particular graphics engine. The presentation identifier field holds data that indicates a unique identifier that distinguishes a first subset of stylesheet records for one presentation from a different second subset of stylesheet records for a different presentation.

In some embodiments of the second set, each stylesheet record also includes a presentation sequence field holding data that indicates an animation sequence for the first concept.

In some embodiments of the second set, each stylesheet record also includes a context field holding data that indicates a subset of instances of the concept based on a first value for a first attribute of a component of the concept.

In other sets of embodiments, a non-transitory computer-readable medium or an apparatus or a system is configured to perform one or more steps of the above method or implement one or more fields of the stylesheet data structure.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 1 is a block diagram that illustrates example hierarchical concepts and relationships in an ontology, with which an embodiment may be used;

FIG. 3A is a block diagram that illustrates an example graphics engine application programming interface (API), used according to an embodiment;

FIG. 3B is a block diagram that illustrates example non-graphics engine application programming interfaces (APIs), used according to some embodiments;

FIG. 6 is a flow chart that illustrates an example method to automatically use previously stored ontology stylesheets, according to an embodiment;

DETAILED DESCRIPTION

Figure 2:
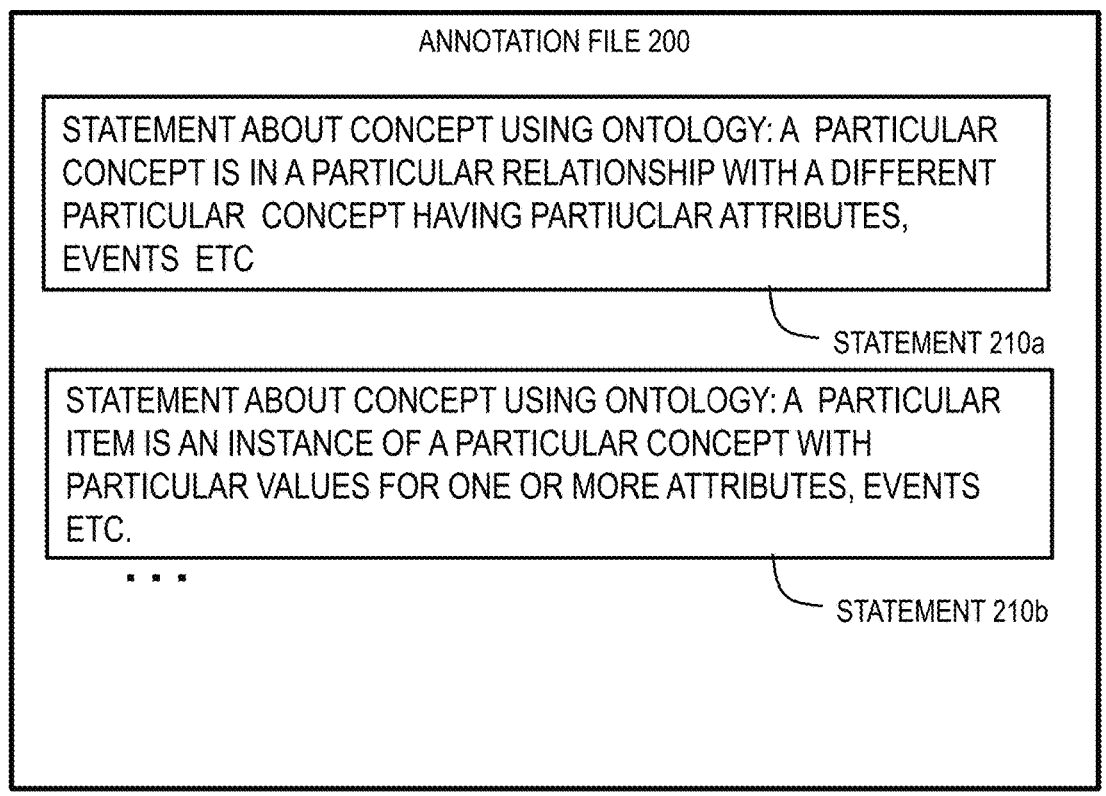
FIG. 2 is a block diagram that illustrates an example annotation file with statements about one or more concepts, according to an embodiment.

A data structure, method and apparatus are described for automatically rendering components of an ontology. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of rendering components of cell pathways based on statements using a BioPax ontology for proteins in various pathways associated with functions of biological cells. However, the invention is not limited to this context. In other embodiments other ontologies are used, such as: a gene ontology for behaviors of genes in biological processes; an astronomical ontology to describe orbit cycles of planets and their moons in newly discovered solar systems; among others. Furthermore, although rendering is described as 3D graphical rendering, in some embodiments, the components and spacing is presently entirely in two dimensions. Thus 3D rendering is intended to include 2D rendering in some embodiments.

1. Overview

Ontologies can be represented visually as graphs with nodes for the various concepts and edges for the membership relationships; and, various tools are available to generate such graphs automatically. However, there are no generic tools to display the concepts and relationships within the ontology, e.g., to render the proteins annotated in a BioPax formatted pathway or to animate the evolution of protein complexes in a cell function pathway.

There are generic tools for an artist to prepare 3D graphics. 3D graphics have become so popular, particularly in video games, that specialized APIs (application programming interfaces) have been created to ease the processes in all stages of computer graphics generation. These APIs have also proved vital to computer graphics hardware manufacturers, as they provide a way for programmers to access the hardware in an abstract way, while still taking advantage of the special hardware of any specific graphics card.

3D computer graphics software produces computer-generated imagery (CGI) through 3D modeling and 3D rendering or produces 3D models for analytic, scientific and industrial purposes. Input usually consists of a mesh of coordinates in 3D space that define the size and shape of an object. 3D surface modeling creates a surface based on an input mesh of triangles, each defined by three x,y,z coordinates, e.g., a table made up of a table top and four legs. 3D volumetric modeling consists of space filling voxels. Surface coloring can combine procedural programs with texture images wrapped around the shape surface. 3D modeling also creates ray traces from a light source to the object and back to a viewer at a viewing position. 3D rendering generates a look of the surface based on lighting conditions, light source and viewer geometry, surface color, surface reflectivity, and mesh volume transparency, among other properties of the surface or mesh. Animation allows for temporal changes in one or more of the mesh membership and location, the modeling, the geometry of light source or viewer, color properties, and the surface properties The API allows a user to input the size of the viewing screen (e.g., number of horizontal and vertical picture elements, pixels, to be presented on output), the mesh to be rendered, the modeling to be done, the position of light sources and viewer, and the types of surfaces to be generated based on the mesh or model, and the temporal changes in any of the above for one or more objects in view.

For example, existing graphic engines include open-source engines, such as Blender • K-3D • MakeHuman • MeshLab • OpenFX • Point Cloud Library • POV-Ray • Seamless3d • Sweet Home 3D • Wings 3D. Closed source graphic engines include 3D-Coat • AC3D • Autodesk 3ds Max • Autodesk Maya • Autodesk Mudbox • AutoQ3D Community • Bryce • Carrara • Cinema 4D • Clara.io • DAZ Studio • Electric Image Animation System • E-on Vue • Golaem Crowd • Hexagon • Houdini • Indigo Renderer • LightWave 3D • MASSIVE • Messiah • Modo • Moment of Inspiration • Poser • RaySupreme • Remo 3D • Rhinoceros 3D • Sculptris • Shade 3D • Shark 3D • Silo • SketchUp • Strata 3D • Swift 3D • Terragen • ZBrush.

FIG. 1 is a block diagram that illustrates example hierarchical concepts and relationships in an ontology, with which an embodiment may be used. At the root of the hierarchy, node 111, is the ontology name, e.g., BioPax. Each edge extending below a node indicates the relationship "has a member." Each edge extending above a node indicates the inverse primary relationship "is a member of." Thus the members of the ontology 111 are the nodes 121, 122, 123, among others represented by ellipsis. Each member can itself have subcomponents indicated in FIG. 1 by edges extending below nodes 121, 122 and 123. The subcomponents can have further sub-components indicated by ellipses below. The level of a node in the hierarchy is indicated by the minimum number of edges to traverse from a current node to the root node, with the root node considered to be at level zero (0). At the base of the ontology are leaf nodes that have no further edges below. Leaf nodes can occur at any level of the ontology other than at the root node, and are indicated in FIG. 1 by diagonal hatching. In the illustrated embodiment, a sixth level is represented by node 171, leaf node 172 and node 173. A seventh level is indicated by leaf node 181 and node 182 that are members of node 171 and leaf nodes 183 and 184 that are members of node 173. An eighth level is indicated by leaf nodes 191 and 192 that are members of node 182. Each node represents a class of objects in the ontology and has one or more attributes that are inherited by each member of the class.

An annotation file includes statements about instances and nodes using one or more ontologies. For example, the annotation file may indicate that members of the class of node 123 have a particular relationship with members of the class of node 121, indicated by a dashed curve in FIG. 1. Similarly, the annotation file may indicate that members of the class of node 123 have a different relationship with members of the class of node 122, indicated by a different dashed curve. In addition, the annotation file includes statements that define instances of a node of the ontology in terms of values for one or more of the attributes defined for, or inherited by, the node, and its component nodes, if any. For example, an annotation record in BioPax would indicate an instance of a protein is provided by a link to a protein database, such as UNIPROT. One or more attributes may be listed explicitly or each may indicate a link or other reference to a field in a different database on a local or a remote server.

FIG. 2 is a block diagram that illustrates an example annotation file 200 with statements about one or more concepts, according to an embodiment. For example, statement 210a indicates that a particular concept is in a particular relationship with a different particular concept, and the relationship has certain attributes, events etc. In some embodiments, the attributes, events etc. for the relationship are each stated in a separate statement about the particular relationship. In another example, statement 210b indicates that a particular item is an instance of a particular concept, and the instance has certain values for each of one or more attributes, events, etc. of the concept. In some embodiments, the attributes, events, etc. for the instance are each stated in a separate statement about the particular instance.

When a selected concept is represented graphically in a scene for static or animated presentation, the rest of the features of the scene must be determined and expressed to a particular 3D graphics engine, as explained in more detail below. The information is passed to the particular 3D graphics engine using the 3D graphics engine application programming interface, API. FIG. 3A is a block diagram that illustrates an example graphics engine application programming interface (API), used according to an embodiment. The interface accepts a series of values which, by order or by keyword, indicates: the particular graphics engine; the output screen properties (e.g., number of horizontal and vertical pixels); the illumination position; the view position and orientation; the number of objects. For each object the API accepts values that indicate, by position or keyword: surface or skeletal mesh for object; model for object; surface properties for object; and position and orientation of the object. Status for the rendering can be provided by the 3D graphics engine through the API in one or more return variables, indicated by position or keyword.

After an initial scene is described and rendered, changes to the scene can be generated by the graphics engine efficiently and therefore quickly. The change information is passed to the graphics engine in a change API that accepts data that indicates, by order or keyword, a change in the illumination strength or position; a change in the view position or orientation (e.g., a viewer can "fly through" a scene so a human can fully comprehend complex 3D structures); or a change in the number of objects (e.g., objects can appear or disappear); or, some combination. For each object, the API accepts values that indicate, by position or keyword; no change; a change in the object mesh (so the object can change size or morph to different shape); a change in the model (so skin can change from hairless to furry); a change in the surface properties (so the object can change color or become more transparent or opaque or reflective or matte); a change in position or orientation of the object; or some combination. Status for the rendering can be provided by the 3D graphics engine through the API in one or more return variables, indicated by position or keyword.

In some embodiments, the scene rendering is affected by computations that are not graphical, such as computations that determine physical interactions (e.g., colliding and rebounding bodies, photon or other radiation particle absorption or emission, electrical or gravitational forces), chemical interactions (e.g., binding events that absorb or release energy to form one or more small molecules) or biological interactions (e.g., cell or organism death, cell division or organism growth, cell or organism metabolism). FIG. 3B is a block diagram that illustrates example non-graphics engine application programming interfaces (APIs) 350, used according to some embodiments. For example, a physics engine API 351 accepts values which indicate, by position or keyword: the physics engine; a function of one or more objects in the scene (e.g., detect collision, avoid collision, resolve collision); the number of objects in the scene. For each object, the API accepts data that indicates a mesh for the object, a mass for the object; a velocity of the object; a charge for the object; a nuclear energy state for atoms in the object; or some combination. As a further example, a chemistry engine API 352 accepts data that indicates, by position or keyword: the chemistry engine; a function of one or more objects of the scene (e.g., bind, release energy, absorb energy, form products, form by-products); number of molecular objects in the scene. For each molecular object the API accepts data that indicates, by position or keywords: the type of molecule; position or concentration of molecule; electron energy state of molecule; or some combination.

Figures 4A, 4B, 4C:
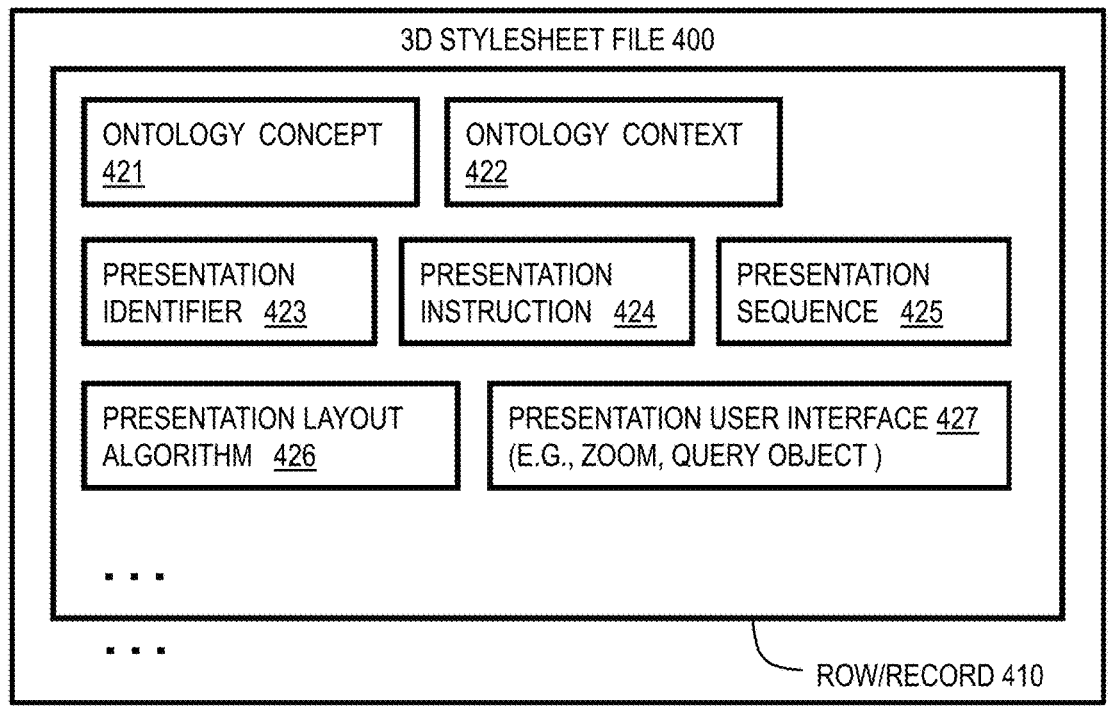
FIG. 4A through FIG. 4C are block diagrams that illustrate an example data structure for a ontology stylesheet, according to an embodiment.

According to various embodiments, a stylesheet data structure is formed to hold information used previously to render a scene from a unique annotation employing the ontology so that the information can be re-used to automatically render a similar scene from the same ontology. The stylesheet is used by a scene builder module 550, described in more detail below with reference to FIG. 5. In many cases, the previously rendered scene was the work of an artist who is also, or works with, a domain expert for the ontology. FIG. 4A through FIG. 4C are block diagrams that illustrate an example data structure 400 for an ontology 3D stylesheet, according to an embodiment. The stylesheet data structure 400 may be stored on a computer-readable medium as any file or database, including a table in a document, a spreadsheet, a relational database, or a RDF store, alone or in combination. The file or database may be stored at a single site or distributed over one or more hosts. The stylesheet 400 includes one or more stylesheet rows or records indicated by record 410 and ellipsis below, which can be arranged in any fashion in the file or database, so long as the fields in each record are linked by proximity or pointers or other reference, e.g., a uniform resource locator (URL).

In the illustrated embodiment, each stylesheet record 410 includes an ontology concept field 421, an ontology context field 422, a presentation identifier field 423, a presentation instruction field 424, a presentation sequence field 425, a presentation layout algorithm field 426, and a presentation user interface field 427, among others indicated by ellipsis inside record 410. The ontology concept field 421 holds data that indicates a concept in the ontology to be included in a 3D graphical scene. The ontology context field 422 holds data that indicates a subset of the instances of the concept indicated in field 421. This field is advantageous because it is often the case that a scene is not intended to include all the instances of a specified concept (in field 421), but just some of those instances. The instances that are within the context of interest are determined by the data in the field 422, such as a range of values for one or more components of the concept, such as relationship values, attribute values, event values, etc. This can be expressed as logic in a particular programming language or a link to a file that contains the code in a programming language or a memory location that contains the code in a machine language ready for execution or statements in a query language, such as the SPARQL language, which is uniquely and specifically designed to query data from RDF (ontology) files. For example, in an illustrated embodiment, the data in field 422 indicates the following logic.

For attribute 1 within range from value1 to value 2
  If relationship 1 predicate is value 3 and relationship 1
    object type is value 4 then instance is in context.

Such context selection is supported in most standard Database APIs. For example, in SQL:
SELECT x FROM y WHERE x is z.
As another example, in SPARQL:
SELECT a,b from Y WHERE x [is a] z AND x [is not] w.

In some embodiments, the 3D presentation relies on the scene including members of the concept that have the above context. In some embodiments, the data in field 421 or in field 422 or both is used by an annotation parsing process or scene building process, described in more detail below with reference to FIG. 5 and FIG. 6. In some embodiments, the context indicated in field 422 for the record at the top level concept uses the annotation statements to find all the members of the concept and list the subset that will be included in the presentation. In some embodiments, the code queries the annotations only for instances of the concept but not all members of the concept, and the instances for each member concept are determined as the context field of each stylesheet record is processed.

The presentation identifier field 423 holds data that distinguishes stylesheet records for one type of presentation (e.g., one style) from stylesheet records for another style in the stylesheet that otherwise include the same concept, or concept and context combination. This is advantageous because there may be several different ways to render the same concept and context. For example, particular members of a class can be represented with great detail or represented schematically, or not at all. Those various renderings can be distinguished based on the data in this field. For example, the first rendering can be indicated by data indicating the name "detailed view" and the second rendering by data indicating the name "coarse view."

The presentation instruction field 424 holds data that indicates data or code to generate values for an API of a particular 3D graphics engine. If the concept is not rendered itself for the current presentation identifier, then the field holds data that indicates no rendering. However, in other fields, described below, the current record indicates how to arrange and sequence multiple components of the concept. The scene builder module 550 then goes on to process the instances of the next member concept. If the concept is rendered, the field 424 holds data that indicates code that describes the 3D object to be used for the concept, and the attributes used to size and orient the object and the type of surface for the object. As a result of operating the code indicated, a set of values are obtained for one 3D object to use in an API of a particular 3D graphical engine. In some embodiments, the results also include values or functions for the API that will cause the concept to be emphasized, e.g., highlighted, in the presentation. Both sets of values are made available to the scene builder process represented by module 550 described below with reference to FIG. 5, which actually builds the scene with all 3D objects and calls the particular 3D graphics engine.

For example, the field 424 indicates information listed in field 424a in FIG. 4B or in field 424b in FIG. 4C about the 3D representation of one or more concepts in the ontology. These representations are each different from indicating each concept as a node and each membership relationship as an edge as in FIG. 1. Field 424a indicates that a particular concept is represented with a particular 3D object, such as a cube, with size and orientation and temporal persistence each determined based on, e.g., a function of, values of one or more attributes. In some embodiments, default values are used when a value of a particular attribute are missing. In some embodiments, an emphasis is provided when the concept is to be highlighted in the presentation, e.g., by increasing the size by a certain percentage, or surrounding the 3D object with a layer of a different color or size or transparency (e.g., change from partly transparent to opaque). An instance of the concept is then represented by the 3D object with the properties determined by the value of those specified attributes for the instance. If the instance does not have a value for a specified attribute, then the default value for that attribute is used. The highlighting options are like "named" functions to alter the representation, which can be called by the application (UI) or by the scene building process itself, to be called at a particular point in time along the animation timeline. The highlighting options are implemented as independent operations that can be applied separately, so that zero, one or more are applied to any instance. In some embodiments, at most only one highlighting option is applied per instance, so the highlighting is more noticeable.

Not only are 3D (or 2D) objects indicated for concepts in the illustrated embodiment (called continuant concepts); but also, in some embodiments, 3D (or 2D) objects are indicated for other elements of the ontology (called occurrant elements), such as relationships, events, and other statements made about the ontology. For example, field 424b in FIG. 4C indicates that a particular relationship between two concepts is represented by a particular 3D object, such as a bar with transparency, width and color based on values of one or more attributes of the relationship. In some embodiments, default values are used when a value of a particular relationship attribute are missing. In some embodiments, an emphasis is provided when the relationship is to be highlighted in the presentation. An instance of the relationship is then represented by the 3D object with the properties determined by the value of those specified attributes for the instance. If the instance does not have a value for a specified attribute, then the default value for that attribute is used. For example, "occurrants" (e.g., actions in an ontology) can be represented by some functional change (toggle color from red to blue) to other objects in the scene, or as 3D models themselves.

The presentation sequence field 425 holds data that indicates sequence of the concept 3D object in the presentation of the data for an animation. If there is no animation, or if the concept in field 421 does not contribute to the animation, then the field is omitted or indicates a null value. For example, if the concept in field 421 has several component concepts that are to contribute to the 3D presentation, then an attribute of those components may be used to sequence the contribution from that component in the animation. The presentation sequence field 425 is blank for the current concept but is filled with a time or sequence value for each of the component concepts. The sequence may contain references to representational modifications (e.g. "emphasize" or "blink") defined in presentation instruction fields of other records in the stylesheet file. The sequence has access to "named" functions attached to representations from other records. Representations have a functional API.

The presentation layout algorithm field 426 holds data that indicates code to determine how to space the 3D objects to be presented together in 3D space. This data indicates what is the 3D position or orientation value, or both, for at least some of the 3D objects passed to the 3D graphical engine API. The 3D objects to be presented are a subset of the 3D objects that could be generated for a particular concept and all its components. In some embodiments, the code indicated in field 426 for the record at the top level concept uses queries of the annotation statements, e.g., using SPARQL, to find all these components and list the subset that will be included in the presentation. In some embodiments, the annotations are used for instances of the concept but not all members of the concept, and the instances for each member concept are determined as the context field of each stylesheet record is processed. The code in the field 426 then arranges the components of that subset in 3D space, as each object is added to the scene, so that there is sufficient separation to distinguish them in the 3D rendering, and assigns each a 3D coordinate value. For such a component, the scene builder module retrieves, from memory or in storage, that component's 3D coordinate value. For example, if the concept in field 421 has several component concepts that are to contribute to the 3D presentation, then the presentation layout algorithm field 426 holds data that indicates code how to space all those components. The presentation layout algorithm field 426 is then blank for each of the component concepts. The layout algorithm is stateful, and thus can be queried and modified. That is the layout algorithm also has a functional API. One layout arranges the participants in a sequence of reactions, each reaction must get the position of the participants and modify them to build the reaction product. That data is stored in the layout model.

The presentation user interface 427 holds data that indicates the properties of the 3D engine API that a user is able to change, e.g., the position of the light source or the position and orientation of the viewer. In some embodiments, the data also indicates an icon, or other active area, and function that is executed when the icon is selected, as indicated in a value of a return variable in the 3D graphics engine API. Thus the scene build will be informed of a user choice. In some embodiments, the user can also indicate one of the 3D objects presented and that object is indicated in a return variable of the API. In response, the scene builder will present symbols that indicate one or more properties of the object indicated. In some embodiments, user interaction is not allowed; and, field 427 is omitted.

Although data structures, messages and fields are depicted in FIG. 2 through FIG. 4C, as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

Figure 5:
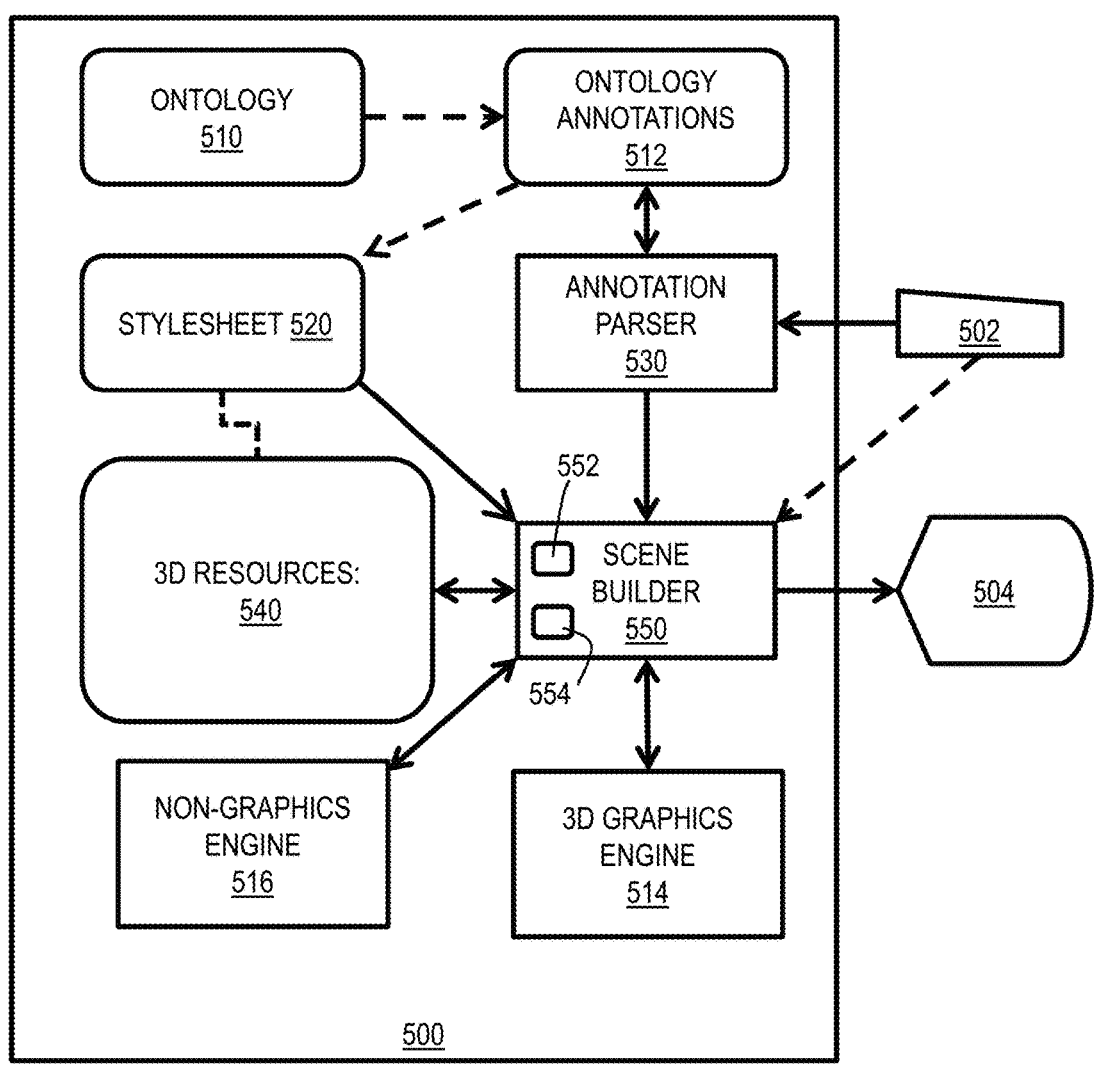
FIG. 5 is a block diagram that illustrates an example system to automatically use previously stored ontology stylesheets, according to an embodiment.

FIG. 5 is a block diagram that illustrates an example system to automatically use previously stored ontology stylesheets, according to an embodiment. Although processes, equipment, and data structures are depicted in FIG. 5 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. The system includes ontology data structure 510 that holds data representing a domain ontology and ontology annotations data structure 512 holding annotations using the ontology as described above with respect to FIG. 2. The 3D graphics engine being used in this embodiment is indicated by 3D graphics engine 514; and, the one or more non-graphics engines being used, if any, are represented by the non-graphics engine 516. The APIs for these engines were described above with reference to FIG. 3A and FIG. 3B, respectively, for the graphics and non-graphics engines. The stylesheet data structure 520 has been described above with reference to FIG. 4A through FIG. 4C.

As indicated above, the ontology in ontology data structure 510 is used to form the statements in the annotations data structure 512. This process often involves performing research to discover the information stored in the annotations or manually generating those statements based on other resources available before the ontology. This process, with manual elements is represented in FIG. 5 by the dashed arrow. As also indicated above, the stylesheet records for a particular type of presentation, indicated by a unique name in the presentation identifier field 423, are generated by an artist or domain expert or both based on particular concepts or instances indicated on the ontology and annotations data structures. In some embodiments, the 3D objects for such components are determined based on 3D procedural or other process resources already available, such as meshes and shaders for spheres or cubes or plates or bars of variable surface types and with variable size, color and transparency, which are easily executed using the API of a particular 3D graphics engine. The work of the artist or domain expert or both is indicated by a dashed arrow from the annotations data structure 512 to the stylesheet and dashed line between the stylesheet data structure 520 and data structure 540. The data structure 540 is included in some embodiments to store such 3D resources that are used or reused by the artist and domain expert who generated the stylesheet. In some embodiments, the stylesheet record points to a record in the 3D resources data structure 540.

The system 500 includes an annotation parser module 530 and a scene builder module 550. The annotation parser module 530 is configured to perform an annotation parsing process that receives, directly or indirectly, a request from a user through an input device 502 (such as pointing device 1216 or other input device 1212 described below with reference to FIG. 12), or a request from another process, such as the scene builder 550, to find one or more instances of an concept in the annotations data structure 512. In some embodiments, all instances of all components are also retrieved, or just the subset of component instances that satisfy a certain context.

The scene builder module 550 is configured to perform a scene building process that determines, for each instance in the context received from the annotation parser module 530, the presentation information from the stylesheet for all matching concepts. The scene builder module 550 passes the presentation information to the 3D graphics engine and any non-graphics engines to render one or more frames of a presentation that is displayed on display device 504 for a the user. In some embodiments, the position of components in the rendering is determined while processing a different stylesheet record than the 3D object, and these positions are stored in memory 552, e.g., as the layout API. In some embodiments, the animation sequence of components in the rendering is determined while processing a different stylesheet record than the 3D object, and such animation sequences are stored in memory 554, which may be on the same or different memory device. In some embodiments, the user is allowed to change the presentation, e.g., by rotating or flying through the scene. In some embodiments, the user is allowed to select a 3D object presented on the display, and then request or otherwise obtain information about the instance that the 3D object represents. This interaction from the user is represented in FIG. 5 by the dashed arrow from input device 502 to the scene builder.

FIG. 6 is a flow chart that illustrates an example method to automatically use previously stored ontology stylesheet records, according to an embodiment. Although steps are depicted in FIG. 6 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

Steps 601 through 605 refer to manual steps performed by one or more domain experts or artists before execution of process steps by the annotation parser module 530 or scene builder 550. These steps populate statements in the annotation file 512 or records in stylesheet 520. In step 601, one or more statement records 210 are prepared for and stored in the annotation file 200 to describe one or more instances of concepts or relationships, including any attributes thereof based on the ontology. In step 603, one or more records in the stylesheet are prepared for each of one or more concepts, or concept contexts, including one stylesheet record for each component of the concept, or context, that affects the presentation. This includes storing or executing, or both, in field 426, data or algorithm instructions for spacing components of a concept in the 3D space of a scene or data; or, storing or executing, or both, in field 425, data or algorithm instructions for sequencing components of a concept in an animation of the scene. In step 605, data to support the generation of 3D graphics engine API commands is prepared and indicated by data stored in the presentation instruction field 424.

Steps 611 and 613, outlined by a dotted box, are automatically performed by one or more processors implementing the annotation parser module 530. In step 611, a request is received from a user, e.g., through input device 502, to present an instance of a concept in the ontology. In some embodiments, the user is presented with choices, such as a list of instances of concepts in the ontology. In some embodiments, the choices presented include one or more contexts or one or more presentation identifiers already in the stylesheet file. In step 613, the annotation file is queried to obtain statements about the requested instance and assemble as many attributes, component concepts, relationships, events etc. as indicated by the request. The resulting list of instances are passed to step 621 of a scene builder module 550, e.g., through an API for the scene builder, or in a table, or as a pointer to a resource including that information.

The remaining steps 621 through 657, outlined by a dashed box, are automatically performed by one or more processors implementing the scene builder module 550. In step 621, the stylesheet is queried for any records addressed to the highest level concept in the results of the user request. It is assumed for purpose of illustration, that the concept requested by the user, and assembled by the annotation parsing module into a list, includes one instance of concept 171 depicted in FIG. 1, which has two member concepts 181 and 182, the latter of which is composed of two member concepts 191 and 192. In the instance assembled by the annotation parser, it is assumed again for purposes of illustration, that there are two instances of concept 181 and one instance of concept 182 made up of three instances of concept 191 and no instance of concept 192. The highest level concept is concept 171. As given in Table 1.

TABLE 1

Example requested instance.

Concept 171 instance A
Leaf Concept 181 instance B and instance C
Concept 182 instance D
Leaf Concept 191 instance E, instance F and instance G For illustration, it is assumed that there are three records in the stylesheet for concept 171. One stylesheet record has a context field that is blank, and presentation identifier field that indicates a name "Presentation P1:" a second stylesheet record has a context field that indicates 171-attribute1>$\alpha$, and presentation identifier field that indicates "Presentation P2;" and a third stylesheet record has a context field that indicates 171-relationship1-predicate=$\beta$, and presentation identifier field that indicates "Presentation P3." A fourth stylesheet record has a context field that is also blank, and presentation identifier field that indicates a name "Presentation P4:"

In step 623 it is determined if any stylesheet record is found for the highest level concept. If not, then control passes to step 625. In step 625, the user is informed that the requested concept does not have a pre-formed presentation style. Control passes to step 603 for an artist or domain expert or some combination to develop a stylesheet record for that concept and its components. No automatic presentation is available until one or more stylesheet records are developed for that concept.

If at least one stylesheet record is found in step 623, then in step 631, it is determined whether more than one stylesheet record is found for the highest level requested concept. If so, then in step 633 the choices among which the user must select are determined. Then, control passes back to step 611 and those choices are presented to the user. For example, using the results assumed in step 621, the user is presented with the choice to select Presentation P1 or Presentation P4 with no context for the concept, or Presentation P2 for instances where the concept 171-attribute1>$\alpha$, or Presentation P3 for instances where concept 171-relationship1-predicate=$\beta$. In some embodiments, the choice is made automatically based on some pre-determined criterion, e.g., to output a presentation with the fewest number, greater than one, of 3D objects, or to output a presentation with the most 3D objects, or to use the first stylesheet record that is encountered in the stylesheet file for the requested concept.

If only one stylesheet record is found in step 631, or after one of several choices were presented, then control passes to step 641. For example, using the stylesheet records assumed above, if the choice was made to use presentation P1, then control passes to step 641 to assemble the 3D graphics commands for the current stylesheet record.

For purposes of illustration, it is assumed that Presentation P1 does not represent concept 171 directly, but represent it indirectly by an animation that first presents the leaf concepts at the next level of the ontology (level indicated by callouts in the 180s in FIG. 1) for a certain number of frames, then fading out those concepts and replacing for an equal number of frames by the leaf concepts at the next level (level indicated by callouts in the 190s in FIG. 1). It is further assumed that, in presentation P1, leaf concept 181 is represented by a cone with apex up, leaf concept 191 by a sphere, and leaf concept 192 by a cube balanced on a corner.

For this illustrated embodiment, during step 641, the first stylesheet record is used to assemble one or more commands for 3D graphics engine API for the 3D scene according to the selected Presentation P1. Here the presentation instruction is blank, because the concept 171 is not directly represented. However, presentation layout algorithm field 426 is not blank, but holds data that indicates an algorithm that gives positions of component instances based on instances of leaf concepts that are members of the concept 171. From the results of the annotation parser in Table 1, it is known that the leaf node concepts that are members of concept 171 include leaf concept 181 instance B and instance C and leaf concept 191 instance E, instance F and instance G. Using this information and the algorithm indicated in field 426 of the present stylesheet record, the center 3D coordinates of these five instances B, C, E, F, G are determined and stored in memory 522. For example coordinates for the instances B and C are centered on the left half of the frame and coordinates for instances of E, F, G are centered in the right half of the frame. The size of the objects are selected to be half the closest distance between instance coordinates.

Furthermore, for this illustrated embodiment, presentation sequence field 426 is not blank, but holds data that indicates temporal sequencing of member concepts for Presentation P1 based on instances of leaf concepts that are members of the concept 171. The data indicates instances at the 180$s$ level are presented first, then fade out, then the instances of the 190$s$ level are presented. Using the leaf information in Table 1, it is determined that the 180$s$ level includes instances B and C and that the 190$s$ level includes instances E, F, G. Using the data in field 425 of the present stylesheet record, the timing sequence of these five instances is determined to be first instance B, C and then instances E, F, G. This information is stored in memory 524 using any convention. For example, in one convention, instance B and C have sequence 1,0,0 and instances E, F, G have sequence 0,0,1, where order indicates sequence and number indicates emphasis, with 0 indicating absent, 1 indicating normal presentation and 2 indicating emphasized presentation. In another convention B and C have sequence 1 and instances E, F, G have sequence 3, where the number indicates the relative timing of the instances, 1 preceding time 2, and 3 following time 2, and no instance presented at time 2; and, timing of any emphasis or other supplemental functions is stored separately, e.g., emphasized B, C and E, F, G are emphasized at no time (null value). Based either on data in field 425 or by predetermined instructions, the scene builder determines in step 653, described below, how many frames or how many seconds are used for each sequence portion. For example, in some conventions, the sequence for any instance is given in terms of start and stop times, e.g., in milliseconds, in the data provided in field 425 for the current record.

In step 643 it is determined if there is another stylesheet records for the same value of the presentation identifier field. For example, the commands for member concepts are in separate stylesheet records, which also provides the means to handle recursive or iterative processes. If so, then control passes to step 645 to get the next stylesheet record. For example, in the illustrated example, there are other records with the presentation identifier "Presentation P1" for leaf concepts 181, 191 and 192. In step 645, the next stylesheet record for presentation P1 and a component of concept 171 is found. Step 645 includes calling the annotation parser module 530 to obtain the instances of the concept in the new stylesheet record based on the context field of the new stylesheet record. Control passes back to step 641, where the instances retrieved from the annotation parser are processed according to the new stylesheet record to assemble additional data for the API of the 3D graphics engine.

For example, in the illustrated embodiment, a stylesheet record is found for concept 181. That stylesheet record includes, in presentation instruction field 424, data that indicates inserting a cone at a location and a time of an animation previously determined and stored in memory. This code is used for both instances B and C of concept 181 at the locations stored in memory 552 for those instances and at the relative times indicated in memory 554. Similarly, in the illustrated embodiment, a stylesheet record is found for concept 191. That stylesheet record includes, in presentation instruction field 424, data that indicates inserting a sphere at a desired location and a desired time of an animation. This code is used for all three instances E, F and G of concept 191 at the locations stored in memory 552 for those instances and at the relative times indicated in memory 554 for those instances.

If it is determined, in step 643, that there are no further nested records, then control passes to step 651. In step 651, the API commands assembled in step 641 are then used to call the particular 3D graphics engine being used, and issue the commands through the engine's API. In return, a status of the graphical rendering is received. In some embodiments, the 3D graphical engine drives the display device 504. In some embodiments, the 3D graphics engine returns a pointer to an image or video file, and in step 653, the image or video file is sent to the display device 504, such as a video monitor or other device indicated by display 1214 in FIG. 12.

In some embodiments, the user can interact with the presentation made. For example the user can change the point of view or select an object displayed to obtain further information about the object. Alternatively, a user can use the state of the scene to define entry points to build the next animation. For example, once a complex X has formed, a user should be able to view any reactions in which complex X is a reactant. In some embodiments, keystrokes can convey the user request for action. In some embodiments, one or more active areas are included on the display. A screen presented on a display device can include, in various embodiments, one or more active areas that allow a user to input data to operate on data represented by the presentation. As is well known, an active area is a portion of a display to which a user can point using a pointing device (such as a cursor and cursor movement device, or a touch screen) to cause an action to be initiated by the device that includes the display. Well known forms of active areas are stand alone buttons, radio buttons, check lists, pull down menus, scrolling lists, and text boxes, among others. In various embodiments, one or more screens, windows or active areas, or portions thereof, are arranged in a different order, are of different types, or one or more are omitted, or additional areas are included or the user interfaces are changed in some combination of ways.

In step 655, it is determined whether user input has been detected. If not, the process is complete. If so, control passes to step 657.

In step 657, a command issued through the API is changed based on the user input. For example, the point of view or timing of the animation or location of light source is changed. If the user has selected a rendered object, a new API command is generated to insert data on the screen in response, such as providing default information about the instance represented by the 3D object, or a menu list of queries that could be posed about the rendered object. A subsequent selection by the user of a menu option causes an API command to be generated to provide the requested information about the object on the display device. After the change is made to the API commands, control passes back to step 651 to issue the revised API commands.

2. Example Embodiments

Two example embodiments are described herein in more detail. The first for biological pathways; the second for protein complexes.

2.1 Pathways

According to an example embodiment, the BioPax ontology and existing annotations are used to generate stylesheet records for an example presentation identifier, "Causal-View," which shows just the enzymes and final products of certain pathways in the BioPax domain. These records can be re-used to automatically generate a new 3D rendering of the same type at any time, even after the BioPax annotations have been updated.

The members of the BioPax ontology are proteins, genes, complexes of multiple proteins or proteins and genes, reactions involving proteins or complexes, pathway steps each involving one or more reactions, and pathways involving one or more steps or other pathways. Pathway concepts in BioPax are recursive; Pathways have pathway components of other pathways. For the sake of simplicity, we'll focus our example on a single pathway that has only non-pathway children. BioPax is an ontology of biochemical reactions and components involved in cell signaling pathways. It covers proteomic and genomic interactions.

Figure 7A:
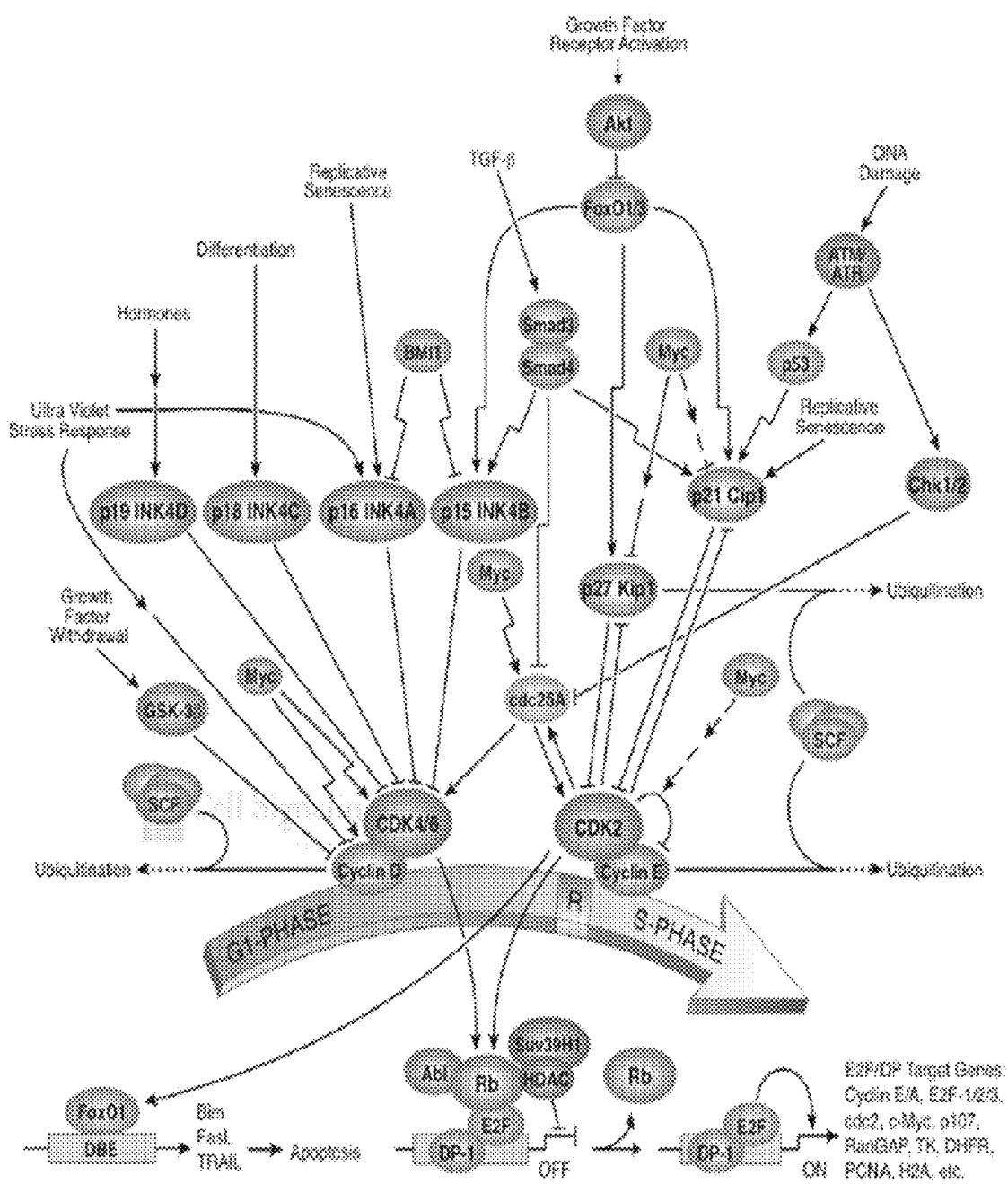
FIG. 7A and FIG. 7B are a block diagram that illustrates an example pathway of sub-pathways that can be stored in a BioPax ontology to drive an example animation, according to an embodiment.
Figure 7B:
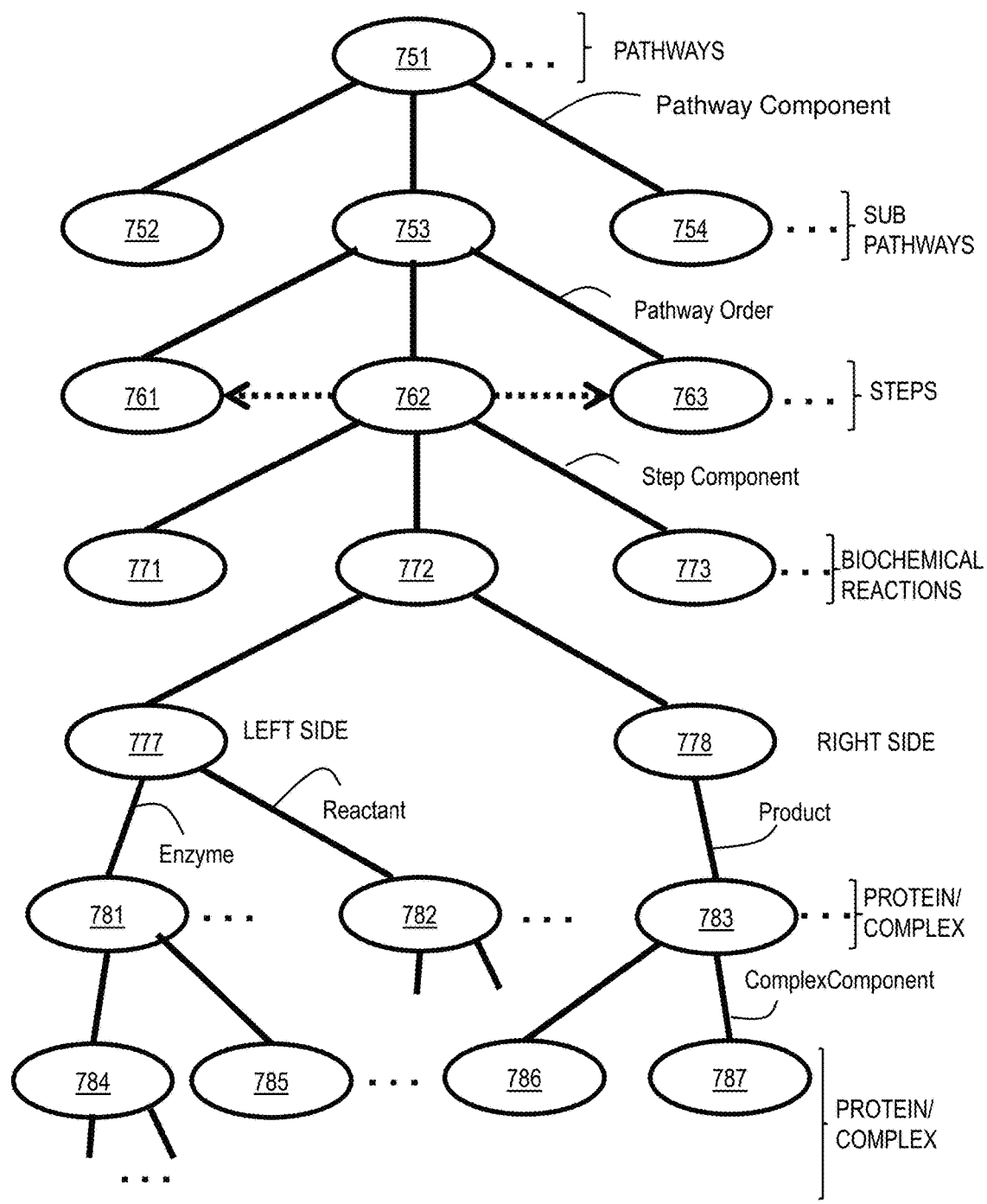

In this example, the creation of a style-sheet and an annotation parser for a pathway annotated with the BioPax ontology is demonstrated. The ontology is designed to handle the members of a pathway in a directed network graph, similar to the one shown in FIG. 7A. FIG. 7A is a block diagram that illustrates an example pathway of sub-pathways that can be stored in a BioPax ontology to drive an example animation, according to an embodiment. This is just a diagram as typically drawn, illustrative of the kind of knowledge that can be encoded in an annotation FIG. 7B is an example ontology for describing such pathways. The main concept at node 751 is a pathway. A pathway has as members zero or more sub-pathways indicated by nodes 752, 753, 754 and following ellipsis. Some sub-pathways have as members one or more steps indicated by nodes 761, 762, 763 and following ellipsis. Each step has members that are one or more biochemical reactions, as indicated by nodes 771, 772, 773 and following ellipsis. Each biochemical reaction has a left side, represented by node 777 that is made up of zero or more enzymes, represented by node 781 and following ellipsis, and one or more reactants represented by node 782 and following ellipsis. The result of the reaction is the right side represented by node 778 and one or more products 783. Each enzyme, reactant and product is made up of one or more proteins or complexes of multiple proteins lightly bound together. The proteins are the leaf concepts. Thus each complex has two or more proteins or small molecule members. In FIG. 7B, nodes 785, 786 and 787 represent protein leaf concepts, and nodes 781, 784, 782 and 783 represent complexes.

In this example, a stylesheet and an annotation parser are created for a pathway annotated with the BioPax ontology. This example illustrates a known presentation style that creates a causal-view graphical layout that displays just enzymes for biochemical reactions and the products of those reactions. The presentation style identifier is arbitrary but is used to group concepts together that are meant to be represented together. For this example, the presentation identifier is the name "CausalView.". To complete this presentation type, stylesheet records for the following concepts are defined: Pathway; PathwayStep; BiochemicalReaction; Protein; and Complex. Stylesheet records for three of these are described below. In the following, an expressions in SPARQL (to indicate a concept component from an annotation file) is sometimes indicated.

The Pathway Stylesheet Record.

The concept being visualized here is the BioPax Pathway concept (bp:Pathway), and thus the value for the ontology concept is "bp:Pathway" indicated by data in field 421. For simplicity, the example animation includes a subset of all pathways, including only the lowest level pathway concepts in the recursive chain. This is the "context" for the pathway concepts included in the animation. The context field 422 specifies low level pathways from other pathways. In an example, the value is the SPARQL command which selects any bp:Pathway that has subsumption relationship to other pathways. In BioPax, Pathways membership relationship is indicated by the bp:PathwayComponent predicate. Therefore, in plain English, the context field 422 holds data indicating the SPARQL query to select bp:Pathways that have no relationships with predicate of bp:PathwayComponent and object of bp:Pathway. As stated above the presentation identifier field 423 holds data that indicates "CausalView." The presentation instruction field 424 is blank, or null value, because the pathway itself is not represented by a 3D object.

The presentation sequence field 425 holds data that indicates a time order for presenting components of this pathway concept. Even though the pathway has no physical representation, it does have action sequences that defines how the animation of the pathway is to take place. Some pathways contain explicit concepts called "pathwaySteps". These pathwayStep concepts define the sequential order of events in the pathway for the purposes of the example animation. The sequence is not fully defined by the pathway's definition of pathway steps. Rather, one has to follow the pathway steps themselves to look for sequential occurrences (e.g. step1 THEN step 2) and branching occurrences (e.g. step1 THEN step2 AND step3).

Figure 8:
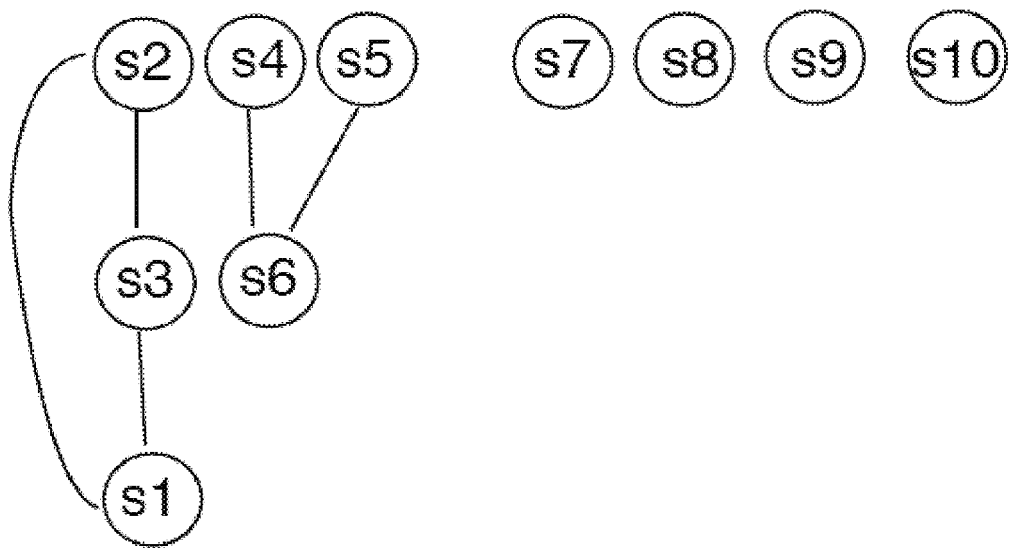
FIG. 8 is a block diagram that illustrates example steps in several pathway concepts that satisfy a particular relationship (context), according to an embodiment.

The pathway step concepts in the example annotation file are concatenated in the view of FIG. 8. FIG. 8 is a block diagram that illustrates example steps in several pathway concepts that satisfy a particular relationship (context), according to an embodiment. The top row of pathway steps are all triggered in parallel. When pathway step 2 finishes, pathway step 3 is triggered. Pathway step 3 triggers pathway step 1, which in turn restarts part of the pathway at pathway step 2. For our representation style, the pathway's only responsibility is to trigger the first wave of pathway steps (step 2, 4, 5, 7, 8, 9 and 10). The action sequences in the other pathway steps will trigger their downstream events. Both SPARQL queries and simple algorithm are used to determine which pathway steps are the top level. The result of that program is an action sequence like the following:

1. TRIGGER bp:PathwayStep2
2. AND TRIGGER bp:PathwayStep4
3. AND TRIGGER bp:PathwayStep5
4. AND TRIGGER bp:PathwayStep7
5. AND TRIGGER bp:PathwayStep8
6. AND TRIGGER bp:PathwayStep9
7. AND TRIGGER bp:PathwayStep10

This action sequence entails that action sequences for pathway steps are advantageously used to pass the animation along.

The presentation layout algorithm field 426 holds data that positions the various components to be included in the animation. Although the pathway has no physical representation, its components do. Rather than delegating the positioning responsibilities to the components themselves, it makes more sense to have the pathway arrange its members in a coherent and sensible fashion.

Figure 9:
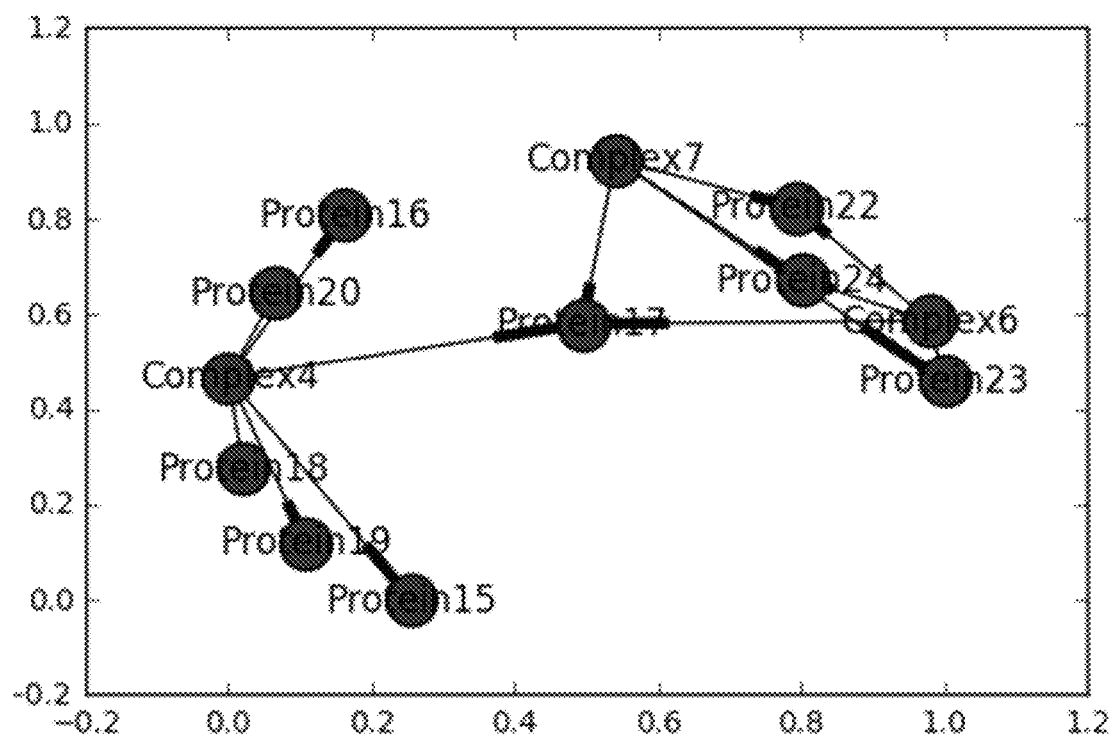
FIG. 9 is a graph that illustrates example enzymes in three steps of one pathway concept that satisfies the particular context, according to an embodiment.

Recall that the annotation parser 530 determines the components of the animation in step 613, described above. A common view of pathway diagrams is the hierarchical network view. Any implementation of such a layout may be used. It is taken as given that such an algorithm exists and can be implemented in the language being used by the ontological animation system. The layout algorithm is responsible for arranging the enzymes and protein products in 3D presentation space (also called world space), according to the reactions in which they are defined to participate in the annotation. For example, a SPARQL enabled program digests the annotation, grabs the relevant pathway (e.g., pathway3) and creates a graphical hierarchy with proteins and protein complexes as nodes. The program searches for control relationships between enzyme and products, which define a directed edge between nodes in the graph, as shown in FIG. 9. FIG. 9 is a graph that illustrates example enzymes in three steps of one pathway concept that satisfies the particular context, according to an embodiment.

Figure 10:
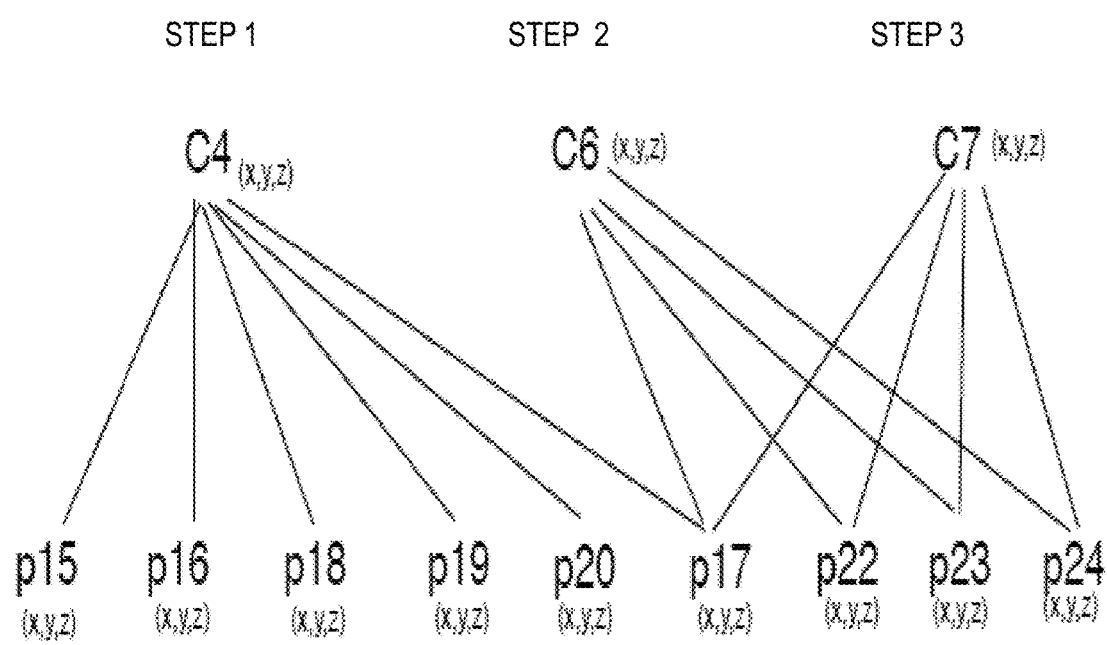
FIG. 10 is a graph that illustrates an example spatial layout for the three steps of the one pathway of FIG. 9, according to an embodiment.

Returning to the presentation layout algorithm indicated in field 425, the information in FIG. 9 about the components to be included, is used to layout the component of the animation in 3D space, as shown in FIG. 10. FIG. 10 is a graph that illustrates an example spatial layout for the three steps of the one pathway of FIG. 9, according to an embodiment. Note that the layout algorithm produces the (x,y,z) coordinates only. The above view is simply a representation of how those x,y,z coordinates are arranged relative to each other. The x,y,z coordinates are given for each complex or protein concept described by Pathway 3 that participates as either a controller or a product of a biochemical reaction. This does not represent all biochemical reactions listed as components of pathway 3. Many of the other reactions describe complex formation events, which are not the scope of this particular view. Hence those steps, while still inherently present in the pathway, will not be represented on screen as part of this presentation. It is an important distinction with other automatic ontology presentation techniques, which only represent membership and not complex attributes of the annotation statements.

The PathwayStep Stylesheet Record.

The pathway step is an abstract place holder for actions that happen as part of the natural progression of the pathway. In this case, only the pathway steps that refer to controlled enzymatic biochemeical reactions are of interest. PathwaySteps are connected to pathways by the bp:pathwayOrder predicate. Thus the concept field 421 holds data that indicates bp:Pathway Step. The context field 422 holds data that indicate biochemical reactions, which all steps do, and thus can be blank or null in some embodiments. In some embodiments, the data in field 422 indicates bp:PathwayStep instances referenced by bp:Pathway concepts. The SPARQL path for such instances would be something like

---

SELECT ?Y FROM OWLFILE WHERE
{?X bp:PathwayOrder ?Y. }

---

In some embodiments, only pathway steps (?Y) that have bp:stepProcess of type bp:Control? are used. The presentation identifier field 423 holds data that indicates "CausalView" to link this record to the other records of the same presentation style. Just as the pathway concepts do not get physically represented, nor do these pathway steps. The presentation instruction field 424 is blank if indicates a null value.

The presentation sequence field 425 holds data that indicates the next pathway steps in a sequence. For this view of a pathway step instance, the sequence is, in order: 1) scale and coloring of controller entity; 2) return to normal view of controller entity; 3) scale and coloring of "causal arrows"; 4) return to normal view of "causal arrow"; 5) scale and coloring of product entity; 6) return to normal view of product entity. Note that causal arrows are not concepts or attributes in the annotation file but are 3D objects rendered to connect enzymes with the product proteins. As such they are defined in a layout algorithm associated with biochemical reactions. These behaviors are embedded in the representation of the involved proteins and complexes. Both protein complex concepts (bp:Complex) and proteins (bp:Protein) have an attached behavior called emphasize( ). 1. controller.emphasize( ) 2. arrow.emphasize( ) 3. product.emphasize( ). No Layout considerations are needed here because the pathway has performed all layout responsibilities. Thus presentation layout algorithm field 426 is blank or indicates a null value.

Protein Stylesheet Record.

At the lowest level of the stylesheet records for the CausalView is the protein concept. Most of the actors in the 3D scene are proteins or complexes of proteins. Proteins are represented in multiple contexts, both as a controller of a reaction and as the product of a reaction. There are many ways a protein can be represented. A simple option is to use a sphere, whose radius is proportional to the molecular mass of the protein. More advanced options include use of atomic coordinates, many of which are available for free on the share Protein Database (PDB). In the CausalView, only the simplest representation of proteins is sufficient. So these proteins are represented as spheres, in some embodiments, with a radius proportional to molecular mass. The BioPax Ontology itself has no concepts for individual instances of proteins; AKT vs EGFR are all bp:Protein concepts. The annotation will usually contain information mapping one protein to a protein instance: e.g., bp:Protein1 to AKT1. To represent protein instances in the example stylesheet then, instructions in field 424 include: identifying the protein instance; getting the protein molecular mass; creating the geometry; shading (coloring) the geometry. Some embodiments also provide instructions for how the geometry, position, rotation, scale, and shading can change in a coordinated fashion for various potential uses throughout the stylesheet. This is the part of the creation process that involves the greatest collaborative effort between domain experts and 3D artists. In the example style, only two behaviors are distinguished: 1. Complex Binding which provides information needed by complex representation to combine proteins into a complex 2. Emphasis event: A stylistic way of emphasizing a protein/complex role in a presentation of the reaction.

Thus, in the example embodiment, the various fields in the protein stylesheet record have the following kinds of data. The concept field 421 holds data that indicates bp:Protein 2. The context field 422 holds data that indicates every protein in the ontology annotation file requires the same representation instructions; only the parameters change (e.g., size, in some embodiments). The presentation identifier field 423 holds data that indicates "CausalView."

The presentation instruction field 424 holds data that indicates each protein is a sphere with a radius proportional to the molecular mass of the protein instance. Instructions like the following can accomplish that.

1. GetInstance(concept)
2. GetMolecularWeight(instanceID)
3. CreateProtien(molecularWeight)→shape and material The implementation of the functions above can be in any language supported by the server or machine on which the system is implemented. It is enough to define the implementation of these functions, which can be run on request by the Scene Builder module 550 of the system. Caches of the final representation can be stored in a relational database for use in other annotation files that make mention of the same protein instance using the same styles. That is, AKT1 is used in more than one pathway annotation file. With the instruction GetInstance( ), the protein instance is stored as a relationship inside the bp:Protein concept in the annotation file. BioPax asks that references to the protein instance be stored in the bp:ProteinReference predicate, which in turn stores a reference to the bp:xref predicate, which ultimately stores the information for unique, ontological identification of the protein instance. For the instruction GetMolecularWeight( ), APIs exist already for querying molecular weight (and other information) of proteins based on some database identifier (ID). Assuming the API and query-parameters are known to use for each database, the information from GetInstance( ) is used to make a query on the matching API to get the molecular weight. For the instruction createProtein( ), most 3D APIs have existing routines for creating primitive shapes. For this example, our proteins will be represented as simple spheres with radii proportional to the molecular weight of the protein they represent. The function returns both the shape (3D coordinates of surface shape triangles) and a material for coloring the shape. There are many ways to implement this function. One way would be to have only one already built sphere in the database of 3D resources and scale the geometry accordingly. Another way is to create unique geometry objects for each entity on request using 3D API construction functions. Shading instructions for each protein is supplied in accordance with the conceived visual style. One of the features of the emphasis option is to highlight the protein by changing its outward facing color. This is often called the "fresnel effect"; a demonstration of which is shown in FIG. 11 where the camera facing color is blue and the camera orthogonal color is yellow. The shader code to apply will have both the inner and outer colors be identical. On emphasis, the shader code will animate the outer color to some defined color. Assuming the 3D graphics engine is something like the THREE.js library, and that the fragment shader code for a simple material, routines exist for animating mesh attributes (object scale and material shader parameters) over time. A fresnel applied to the color in a script called myProteinShader.js, is written in some embodiments.

The presentation sequence field 425 holds data that indicates a blank or null value. Because the protein concept is not required to animate, there are no action steps. The sequence is controlled by the PathwayStep which indicates whether the protein's involvement is as either a controller or product in order to trigger the emphasize( ) function by the action sequence. The presentation layout algorithm field is blank, or indicates a null value. The protein's world position is controlled by the layout of the bp:Pathway instance of which the bp:Protein instance is a member instance The Layout algorithm of the bp:Pathway has access to the protein's representation position data.

Figure 11A:
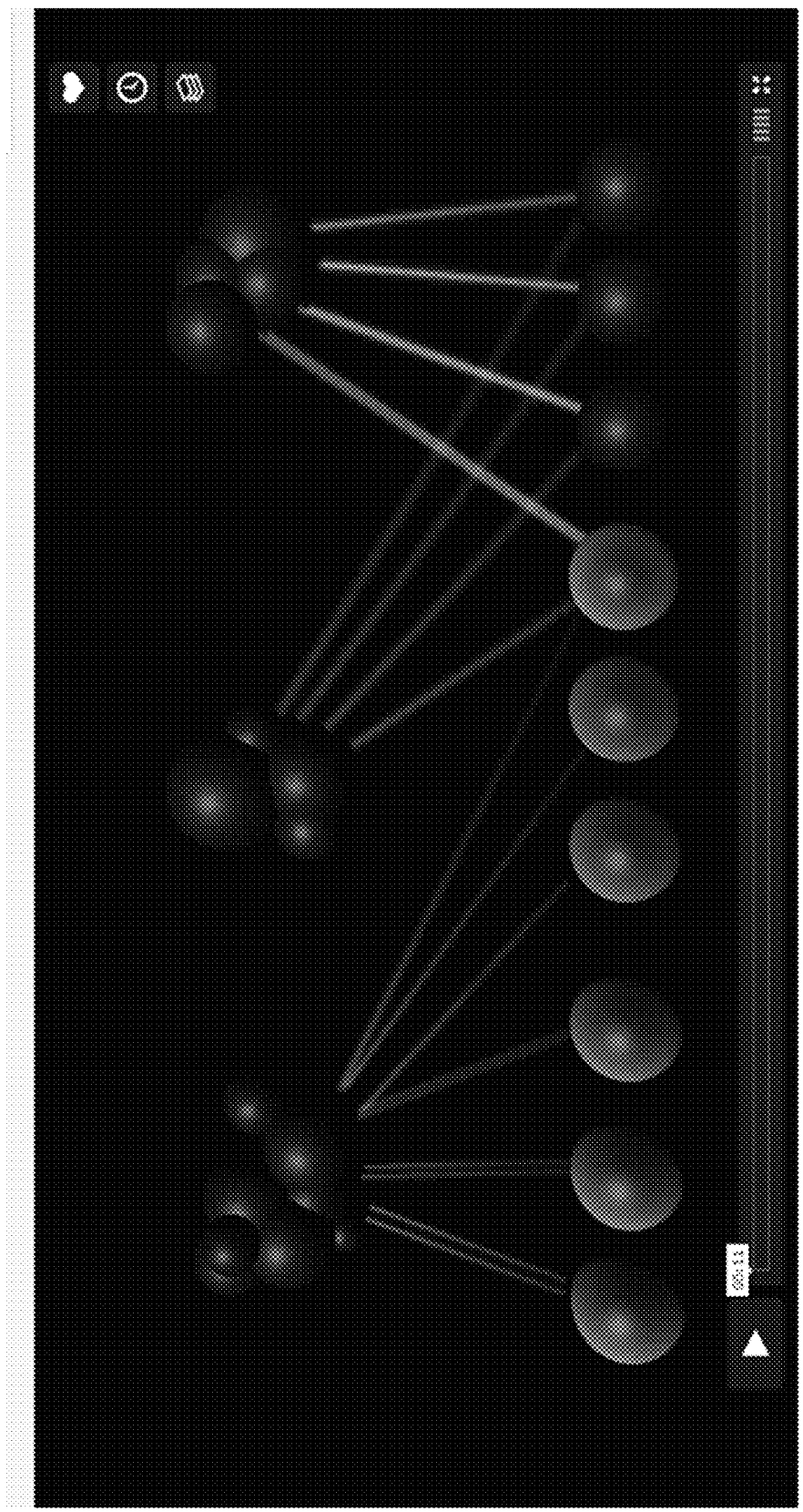
FIG. 11A through FIG. 11D are images that illustrate example frames in an animation automatically generated for the pathway of FIG. 10 using a predetermined stylesheet, according to an embodiment.

FIG. 11A through FIG. 11D are images that illustrate example frames in an animation automatically generated for the pathway of FIG. 10 using a predetermined stylesheet, according to an embodiment. In this embodiment, the product proteins are have similar molecular weight and thus appear about the same size. FIG. 11A is a frame in the animation at the beginning. It shows three complexes as multi-bulb structures along the top of the frame, that are enzymes that cause certain biochemical reactions to occur in each of three steps of a certain pathway (Pathway3). Along the bottom are nine instances of proteins that are products of the three pathway being animated. White bars connect each enzyme with the products that result from the reaction in which that enzyme participates. Other reactions and protein and complexes of the pathway are excluded by the CausalView animation style.

Figure 11B:
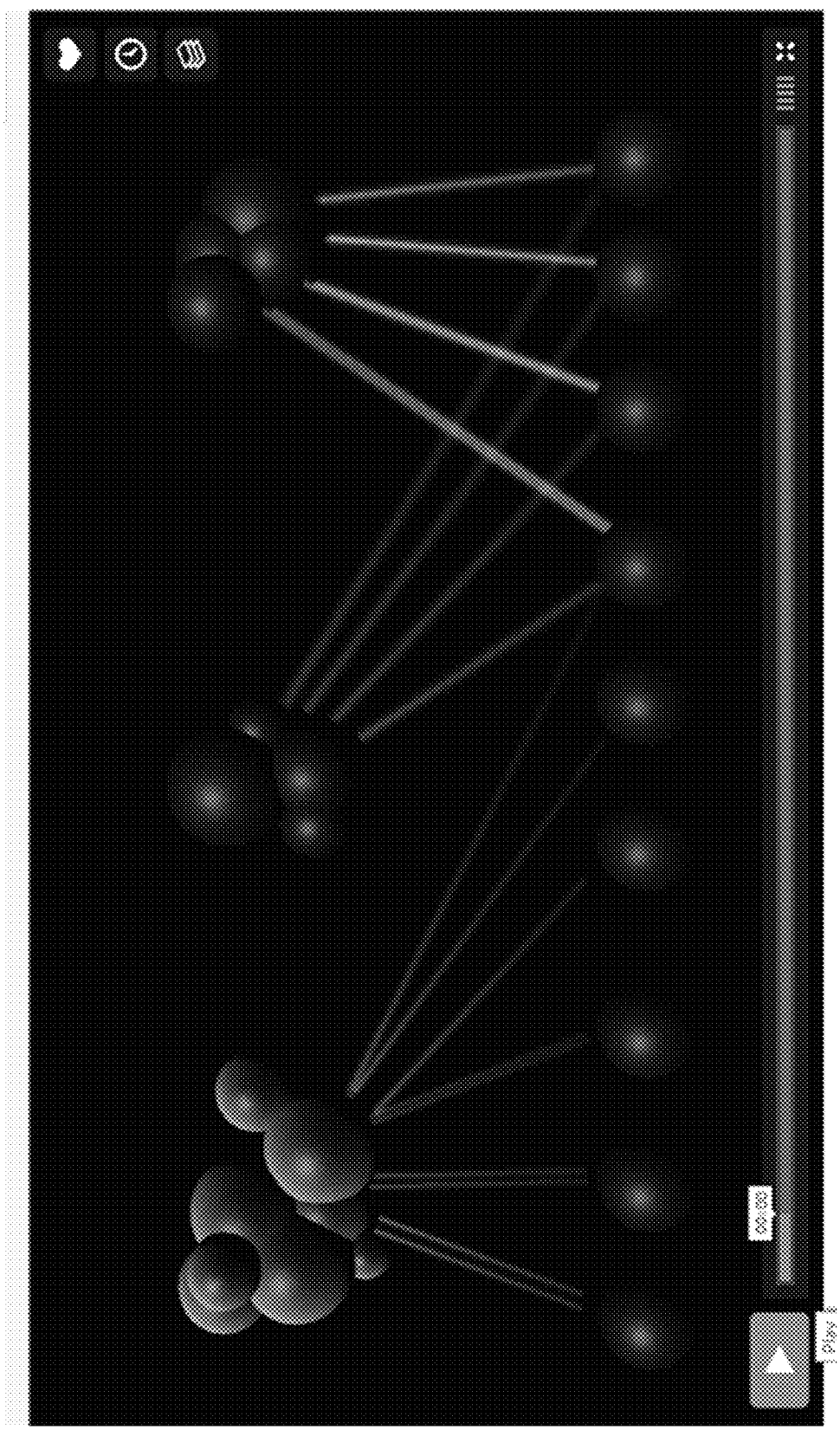
Figure 11C:
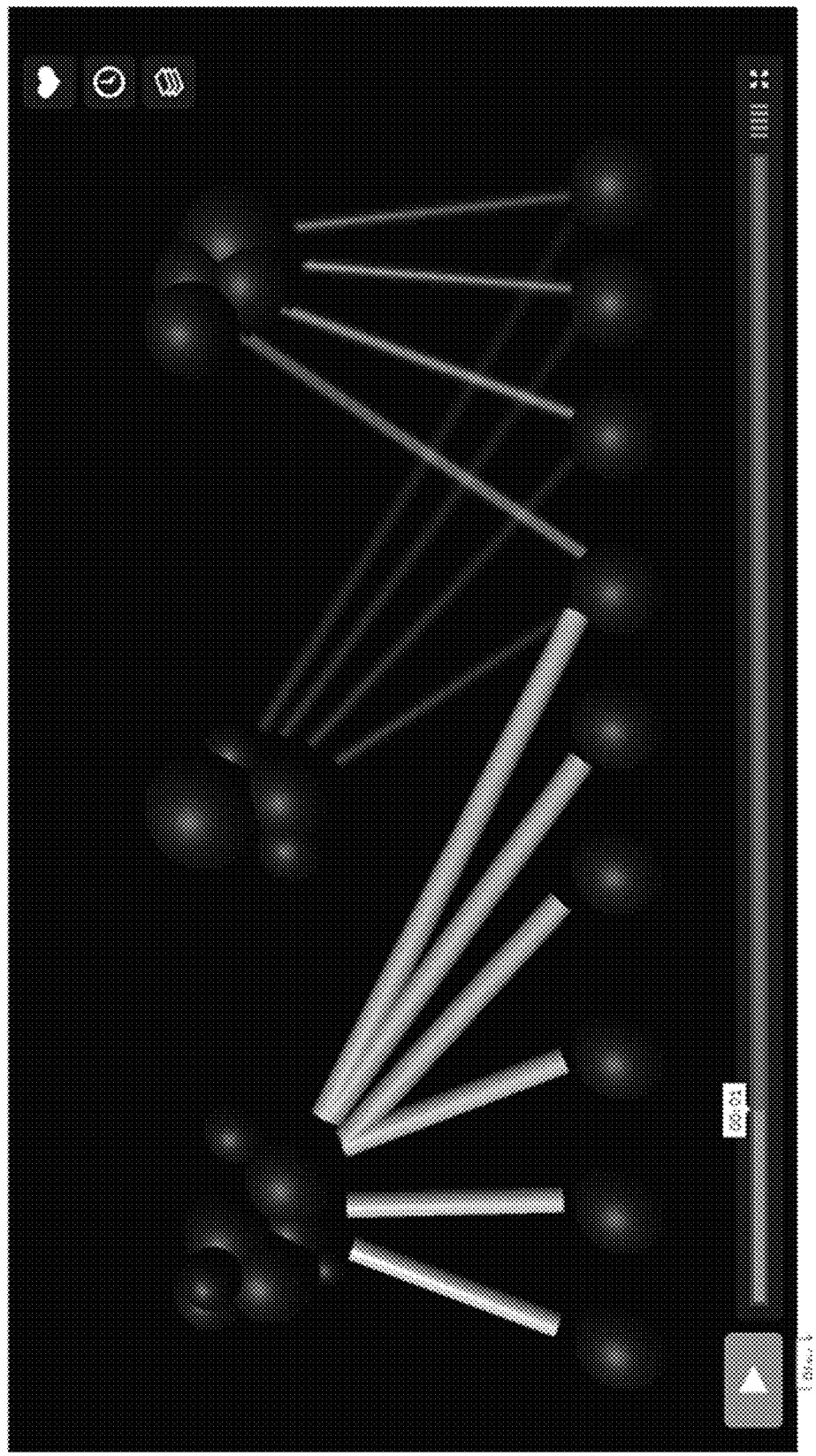
Figure 11D:
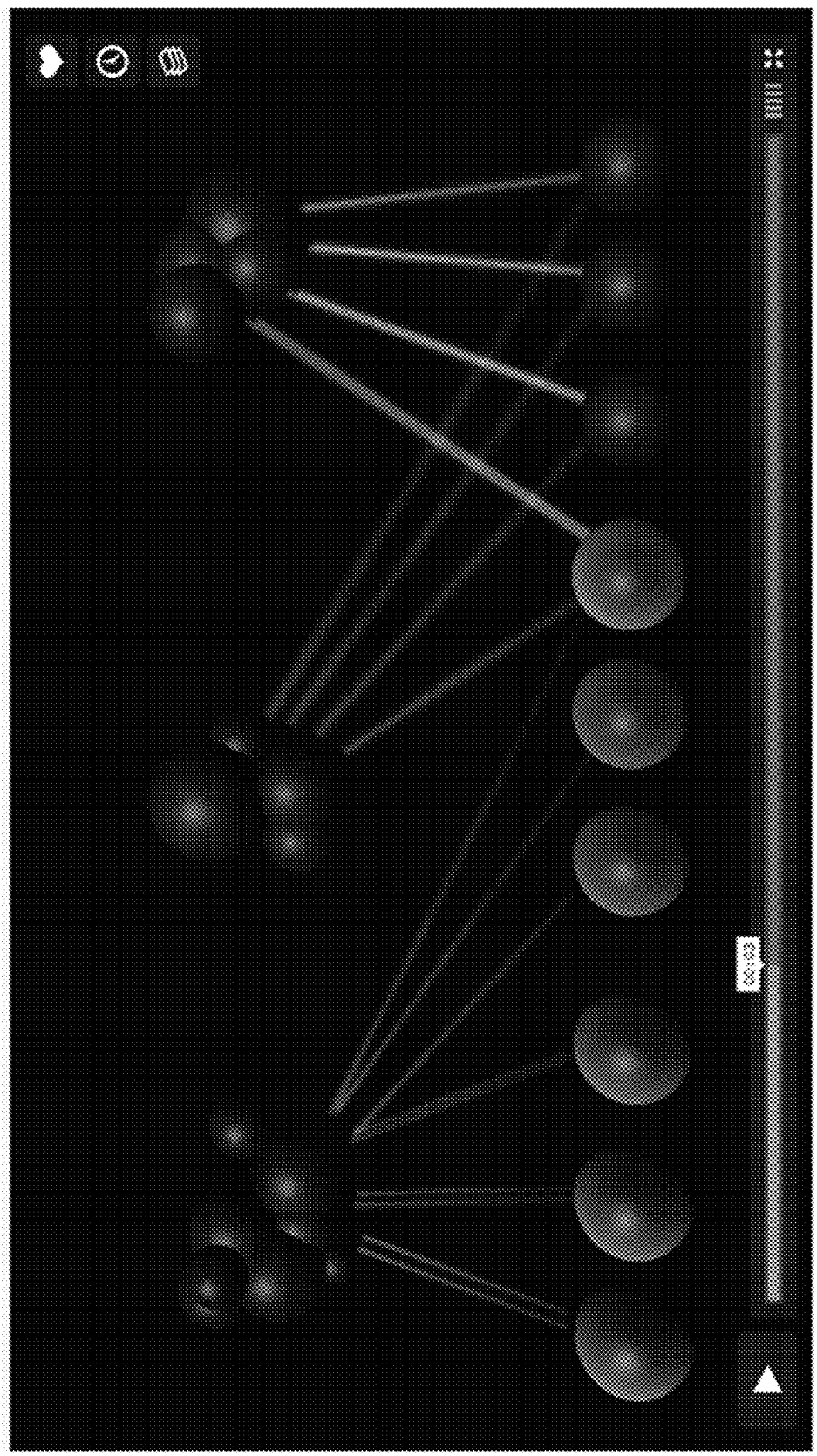

As stated above for the stylesheet record for the pathways step, for this view of a pathway step instance, the sequence is, in order: (1) scale and coloring of controller entity; (2) return to normal view of controller entity; (3) scale and coloring of "causal arrows"; 4) return to normal view of "causal arrow"; (5) scale and coloring of product entity; (6) return to normal view of product entity. FIG. 11B shows sequence (1) for the first reaction: the controlling complex is emphasized in scale and coloring. FIG. 11C shows sequence (3) for the first reaction: the controlling complex is no longer emphasized and the bars representing the causal arrows from that enzyme are emphasized in scale and coloring. FIG. 11D shows sequence (5) for the first reaction: the causal arrows are no longer emphasized and the spheres representing the product proteins from that first reaction are emphasized in scale and coloring.

2.2 Protein Complexes

According to another example embodiment, the style sheet is used to create animations of recursive biological complexes (complexes made of complexes).

Biological complexes are recursive assemblies of molecules. They are recursive in that the basic molecules can join to make one complex, which in turn can be a member of a super-complex, and so and so on. Complexes do not universally assemble in random order (any of the possible combination of events), and therefore the sequence in which a higher order complex comes to be is described in ontological descriptions.

Here, a style-sheet creator is assumed to design his/her style sheet to create animations of complex assembly from an annotation file describing a particular complex assembly. The scope of this particular style-sheet is to create complex assembly animations, the particulars of which are described in the style sheet. For this example, it is assumed that the following sequence occurs (as would be described in the annotation). Protein A binds with small molecule B to produce Complex C, which can bind with protein D to produce complex E. This can be written as:

pA+mB→cC, cC+pD→cE
pA=protein A
mB=molecule B
cC=complex CpD=protein D
cE=final complex E One possible way to view this sequence is to include all of the individual components in space (pA, mB, pD). The representations of pA and mB physically migrate towards each other in a shortest-path course and meet at some intersection point, at which time the representations take their final positions representing cC (the accuracy of this positioning depends on the designer's preference and access to data). The union of pA and mB (cC) and pD then migrate towards each other in a shortest-path course and meet at a unique intersection point, at which time the representations of cC (the group of pA and mB) and pD take their final positions representing cE.

In this hypothetical stylesheet, the concepts (field 421) of interest are protein, molecule, and complex, and the context (filed 422) is null for all of them. In this case we have no qualifiers on our selection (for example, only proteins that participate in pathway-X). We group these rows by a presentation identifier (field 423), which in this case is called "sequential-assembly-formation" so that a user can declare their intention to style complex assembly in some particular way. Critically, field 421 and field 422 are parts of a SPARQL (or other ontological query language) query that interact with the ontology and ontological annotation file.

The rest of the fields belong to the domain of the application logic (CPU) and the rendering (GPU).

Let us now consider the positional layouts as the computational procedures that the designer would have to construct to complete the intended visualization.

Static Layout: A function to distribute the components evenly within a defined 3D boundary, and track the position throughout the animation. The positions of any component can be queried and set.

Reaction Collision: A function to
  identify the reactants in a particular reaction (e.g. pA and mB)
  calculate a target position at which the reactants will meet and react
  calculate a motion path for each reactant to meet at the target location Assembly Formation: A function to take the positions of the reactants after the reaction collision, and move them into their assembly configuration.

These algorithms will hereinafter be referenced by the above names.

The presentation instruction (field 424) tells us how each selection should be drawn onto the canvas. In this example, it is assumed that both molecule and protein entities have 3D surface coordinate data (meshes made up of connected triangular facets) and shading data (a program to color each facet) in a database to which the architect has access. These "protein" and "molecule" concepts are directly representable. The "complex" concept, however, is a composition of other presentations and is thus indirect, or implicit. In fact, it does not exist as a realized component in the animation until after its composition (the subject of our animation) is complete. Therefore the presentation instruction in field 424 would be null for the complexes.

The action sequence (filed 425) is null for the "molecule" and "protein" entities, while that field contains a procedure for the "complex" entity. As per our design, all reactants move to a point in space and then orient themselves into the assembly. First, recall that any given "complex" instance may have other "complex" instances as reactants in the reaction. In order to produce a coherent animation, the designer considers the order of events. In order for the same program (field 425) to be applicable to all instances of type "complex", a recursive lookup and build process is included in the action sequence. For example, the instruction to build complex E includes, by recursion, the instruction build complex C. Therefore, given a recursive function to identify constituent reactants and the functional animations listed above, an action sequence for any given complex entity would be as follows in some embodiments:

1. Use recursive function to infer the necessary temporal sequence of reactions to produce the selected reaction. Examples:
  a. If selection is complex-C, the recursive result would be: "complex-C".
  b. If selection is complex-E, the recursive result would be "complex-C" followed by "complex-E".
2. For each complex in order identified in step 1, step into its action-sequence and execute its instructions 3-6.
3. Reaction Collision part 1—identify reactants.
4. Reaction Collision part 2—calculate target position.
5. Reaction Collision part 3—calculate motion path for reactants, and move reactants along path until reach target position.
6. Assembly Formation—arrange the reactants into their relative positions within the assembly. This algorithm is given location and shape information about each component and arranges them in space.

The layout algorithm (filed 426), tells the scene builder how to arrange each selection in the 3D world. The layout is responsible for setting the initial positions, and for storing the positions of each 3D object over time as they change. An example of how this algorithm might be implemented in this scenario is as follows.

A user provides a selection to animate, e.g. Complex-E.
The recursive lookup algorithm identifies all the unique instances of each type (molecule, protein) that are needed to animate the reaction producing Complex-E.
The algorithm references the representation column for the constituents to get information about representation shape and size.
The algorithm creates a boundary in 3D space capable of containing the reactants with sufficient extra space to move to form the complexes.
The algorithm then evenly distributes the reactants in 3D space.

The positions initialized in the layout algorithm are available for querying and setting by the action sequences. As the action sequence for Complex-C begins; it queries the current positions for protein A and molecule B; it calculates and registers the new positions for protein A and molecule B and updates those positions as the molecules move towards each other at the target position.

The exposed API (field 427) provides the application with tools to bind ontological concept to representational changes. For purposes of illustration, it is assumed that the designer wishes to give the user a way to select complexes, even though they (complexes) do not have a direct, concrete representation themselves. For example, on selection of a complex by the user, the colors of complex members are changed. In field 427, a selection function is defined that takes the "complex" entity id (from a selected active area) as an argument, selects its reactants (recursively), accesses their representation data and sets the color value in the representation code to the desired color. For example, where complex-E is in its fully assembled form, a user could select complex-E and see all the objects that constitute complex-E (pA, mB, pD) change color. They could also select complex-C (being a member of the assembly made up of pA and mB) and see only two of the three reactants changing color; clearly illustrating that (1) complex-E includes complex-C, and (2) complex-C includes two reactants.

One of the advantages of this application setup is that the animation at any point in time is stateful. We could pause the animation and know which occurrents (events) are taking place because the representation on the screen is driven by and tied to the semantic description of the action and the actors. The scene is meaningfully aware of itself.

3. Hardware Overview

Figure 12:
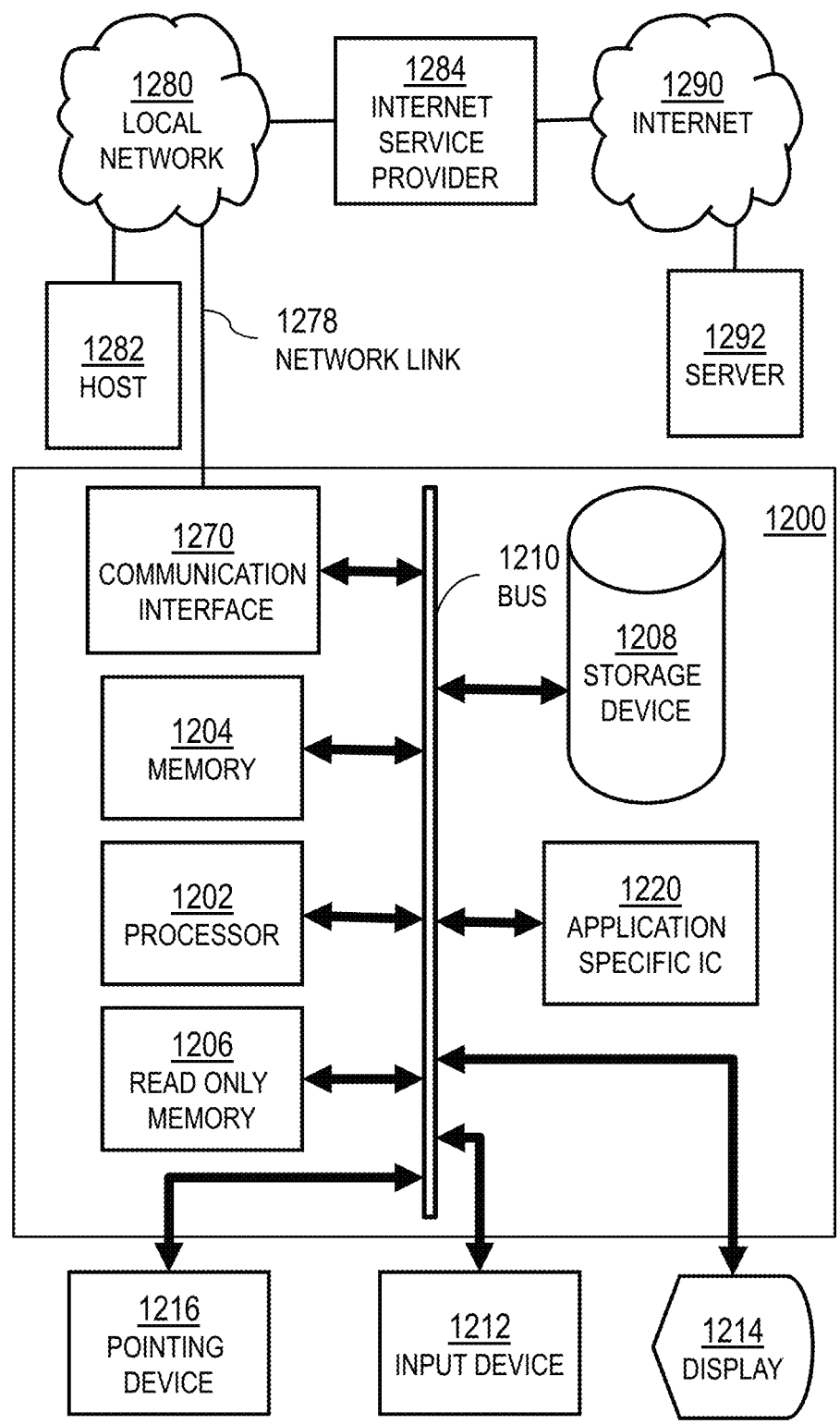
FIG. 12 is a block diagram that illustrates a computer system upon which an embodiment of the invention may be implemented.

FIG. 12 is a block diagram that illustrates a computer system 1200 upon which an embodiment of the invention may be implemented. Computer system 1200 includes a communication mechanism such as a bus 1210 for passing information between other internal and external components of the computer system 1200. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of one or more methods described herein.

A sequence of binary digits constitutes digital data that is used to represent a number or code for a character. A bus 1210 includes many parallel conductors of information so that information is transferred quickly among devices coupled to the bus 1210. One or more processors 1202 for processing information are coupled with the bus 1210. A processor 1202 performs a set of operations on information. The set of operations include bringing information in from the bus 1210 and placing information on the bus 1210. The set of operations also typically include comparing two or more units of information, shifting positions of units of information, and combining two or more units of information, such as by addition or multiplication. A sequence of operations to be executed by the processor 1202 constitutes computer instructions.

Computer system 1200 also includes a memory 1204 coupled to bus 1210. The memory 1204, such as a random access memory (RAM) or other dynamic storage device, stores information including computer instructions. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of computer instructions. The computer system 1200 also includes a read only memory (ROM) 1206 or other static storage device coupled to the bus 1210 for storing static information, including instructions, that is not changed by the computer system 1200. Also coupled to bus 1210 is a non-volatile (persistent) storage device 1208, such as a magnetic disk or optical disk, for storing information, including instructions, that persists even when the computer system 1200 is turned off or otherwise loses power.

Information, including instructions, is provided to the bus 1210 for use by the processor from an external input device 1212, such as a keyboard containing alphanumeric keys operated by a human user, or a sensor. A sensor detects conditions in its vicinity and transforms those detections into signals compatible with the signals used to represent information in computer system 1200. Other external devices coupled to bus 1210, used primarily for interacting with humans, include a display device 1214, such as a cathode ray tube (CRT) or a liquid crystal display (LCD), for presenting images, and a pointing device 1216, such as a mouse or a trackball or cursor direction keys, for controlling a position of a small cursor image presented on the display 1214 and issuing commands associated with graphical elements presented on the display 1214.

In the illustrated embodiment, special purpose hardware, such as an application specific integrated circuit (IC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1270 sends and receives electrical, acoustic or electromagnetic signals, including infrared and optical signals, that carry information streams, such as digital data.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1202, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1202, except for carrier waves and other signals.

Logic encoded in one or more tangible media includes one or both of processor instructions on a computer-readable storage media and special purpose hardware, such as ASIC 1220.

Network link 1278 typically provides information communication through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290. A computer called a server 1292 connected to the Internet provides a service in response to information received over the Internet. For example, server 1292 provides information representing video data for presentation at display 1214.

The invention is related to the use of computer system 1200 for implementing the techniques described herein. According to one embodiment of the invention, those techniques are performed by computer system 1200 in response to processor 1202 executing one or more sequences of one or more instructions contained in memory 1204. Such instructions, also called software and program code, may be read into memory 1204 from another computer-readable medium such as storage device 1208. Execution of the sequences of instructions contained in memory 1204 causes processor 1202 to perform the method steps described herein. In alternative embodiments, hardware, such as application specific integrated circuit 1220, may be used in place of or in combination with software to implement the invention. Thus, embodiments of the invention are not limited to any specific combination of hardware and software.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server 1292 transmits program code for a particular application, requested by a message sent from computer 1200, through Internet 1290, ISP equipment 1284, local network 1280 and communications interface 1270. The received code may be executed by processor 1202 as it is received, or may be stored in storage device 1208 or other non-volatile storage for later execution, or both. In this manner, computer system 1200 may obtain application program code in the form of a signal on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red a carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
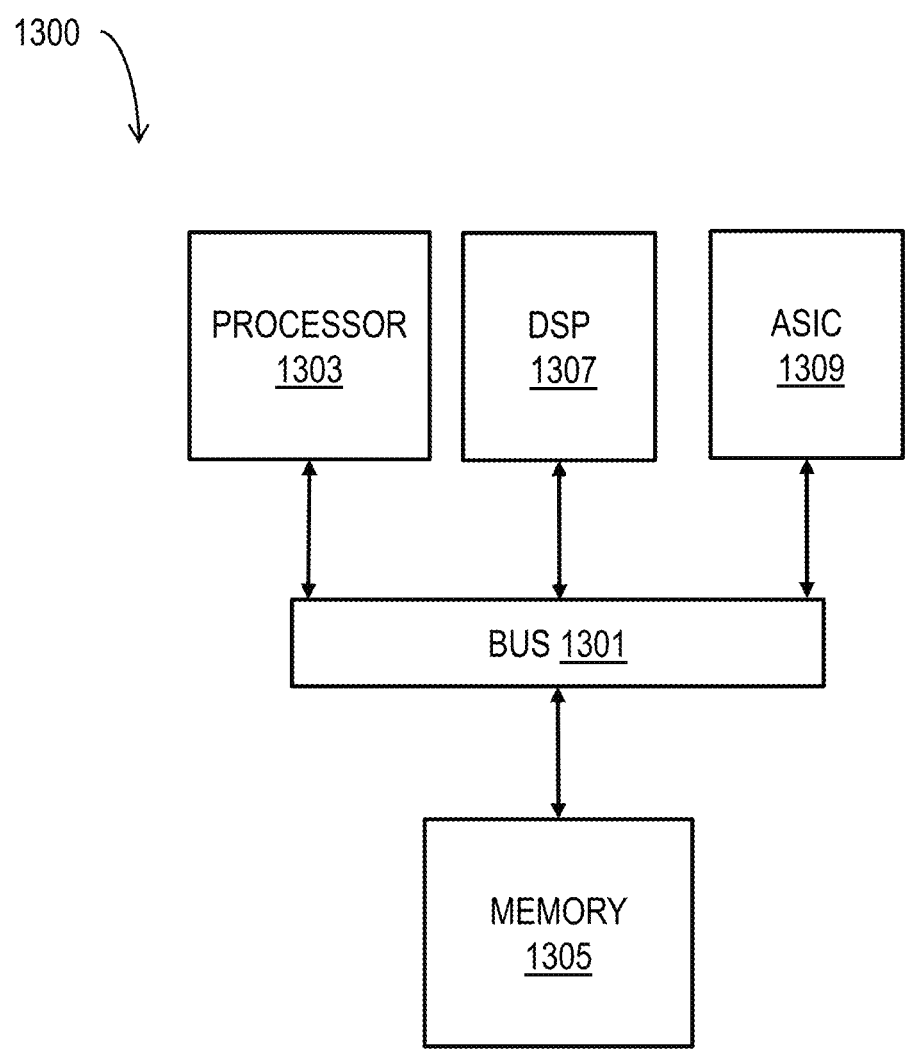
FIG. 13 illustrates a chip set upon which an embodiment of the invention may be implemented.

FIG. 13 illustrates a chip set 1300 upon which an embodiment of the invention may be implemented. Chip set 1300 is programmed to perform one or more steps of a method described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of a method described herein.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1305 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A non-transitory computer-readable medium carrying one or more sequences of instructions for computer animation, wherein execution of the one or more sequences of instructions by one or more processors causes the one or more processors to perform the steps of:
receiving a request to render an instance of a first concept from an annotation file defining an associated ontology;
determining whether a stylesheet file, different from the annotation file, includes a first stylesheet record that indicates the first concept, wherein the first stylesheet record also indicates a first presentation identifier; and
if the stylesheet file includes the first stylesheet record that indicates the first concept, then
rendering an instance of a first component of the first concept at least in part according to a presentation instruction indicated in a second stylesheet record that also indicates the first presentation identifier, and
presenting the rendered instance of the first component on a display device.

2. A non-transitory computer-readable medium as recited in claim 1, wherein: the instance of the first component of the first concept is an instance of the first concept: and, the second stylesheet record is the first stylesheet record.

3. A system for computer animation comprising:
at least one processor; and
at least one memory including one or more sequences of instructions,
the at least one memory and the one or more sequences of instructions configured to, with the at least one processor, cause the apparatus to perform at least the following,
receiving a request to render an instance of a first concept from an annotation file defining an associated ontology;
determining whether a stylesheet file, different from the annotation file, includes a first stylesheet record that indicates the first concept, wherein the first stylesheet record also indicates a first presentation identifier; and,
if the stylesheet file includes the first stylesheet record that indicates the first concept, then
rendering an instance of a first component of the first concept at least in part according to a presentation instruction indicated in a second stylesheet record that also indicates the first presentation identifier, and
presenting the rendered instance of the first component on a display device.

4. A system as recited in claim 3, wherein: the instance of the first component of the first concept is an instance of the first concept: and, the second stylesheet record is the first stylesheet record.

5. A non-transitory computer-readable medium carrying a stylesheet data structure, different from an annotation file defining an associated ontology, for computer animation comprising a plurality of stylesheet records, each comprising:
an ontology concept field holding data that indicates a concept from the annotation file;
a presentation instruction field holding data that indicates instructions for rendering an instance of the concept using a particular graphics engine; and
a presentation identifier field holding data that indicates a unique identifier that distinguishes a first subset of stylesheet records for one presentation from a different second subset of stylesheet records for a different presentation.

6. A non-transitory computer-readable medium carrying a stylesheet data structure as recited in claim 5, wherein each stylesheet record further comprises a presentation layout algorithm field holding data that indicates instructions for retrieving a subset of a plurality of components for the concept, if any, which subset is to be included in a rendering for the concept wherein each component in the subset is in a corresponding different stylesheet record thus referenced directly by the first stylesheet record.

7. A non-transitory computer-readable medium carrying a stylesheet data structure as recited in claim 6, wherein the presentation layout algorithm field holds data that further indicates spacing in the rendering for the subset of components.

8. A non-transitory computer-readable medium carrying a stylesheet data structure as recited in claim 6, wherein each stylesheet record further comprises a presentation sequence field holding data that indicates if the concept in the concept field is to be rendered differently at a different time.

9. A method implemented on a processor for computer animation, the method comprising:
receiving a request to render an instance of a first concept from an annotation file defining an associated ontology;
determining whether a stylesheet file, different from the annotation file, includes a first stylesheet record that indicates the first concept, wherein the first stylesheet record also indicates a first presentation identifier; and
if the stylesheet file includes the first stylesheet record that indicates the first concept, then
rendering an instance of a first component of the first concept at least in part according to a presentation instruction indicated in a second stylesheet record that also indicates the first presentation identifier, and
presenting the rendered instance of the first component on a display device.

10. A method as recited in claim 9, wherein: the instance of the first component of the first concept is an instance of the first concept; and, the second stylesheet record is the first stylesheet record.

11. A method as recited in claim 9, wherein: the instance of the first component of the first concept is not an instance of the first concept; and, the second stylesheet record is different from the first stylesheet record.

12. A method as recited in claim 9, wherein said rendering of the instance of the first component is a three dimensional rendering of the instance of the first component.

13. A method as recited in claim 11, wherein:
the method further comprises repeating said rendering an instance for each component of a plurality of components of the first concept, which plurality of components are in a corresponding plurality of stylesheet records referenced directly or indirectly by the first stylesheet record; and said presenting the rendered instance of the first component on the display device further comprises presenting the rendered instances of the plurality of components.

14. A method as recited in claim 13, wherein:

at least one stylesheet record of the plurality of stylesheet records includes a value for a presentation sequence for a corresponding instance of a component of the concept; and said presenting the rendered instances of the plurality of components further comprises presenting the corresponding instance of the component of the concept differently at a different time according to the value for the presentation sequence.

15. A method as recited in claim 13, wherein:

at least one stylesheet record of the plurality of stylesheet records includes data indicating instructions for spacing the plurality of components corresponding to the plurality of stylesheet records; and said rendering an instance for each component of the plurality of components of the first concept further comprises rendering an instance for each component of the plurality of components according to the instructions for spacing the plurality of components.

* * * * *